United States Patent
Miller et al.

(10) Patent No.: US 10,237,205 B2
(45) Date of Patent: Mar. 19, 2019

(54) SWITCH ROUTING ALGORITHMS

(71) Applicant: The Boeing Company, Chicago, IL (US)

(72) Inventors: Kristina A. Miller, Redondo Beach, CA (US); Tu Q. Le, Cerritos, CA (US); Tae J. Roh, Los Angeles, CA (US); Helen Liu, Los Angeles, CA (US)

(73) Assignee: The Boeing Company, Chicago, IL (US)

( * ) Notice: Subject to any disclaimer, the term of this patent is extended or adjusted under 35 U.S.C. 154(b) by 684 days.

(21) Appl. No.: 13/922,670

(22) Filed: Jun. 20, 2013

(65) Prior Publication Data

US 2014/0376546 A1 Dec. 25, 2014

(51) Int. Cl.
*H04Q 3/68* (2006.01)
*H04L 12/933* (2013.01)
*H04L 12/947* (2013.01)

(52) U.S. Cl.
CPC .......... *H04L 49/1515* (2013.01); *H04L 49/25* (2013.01); *H04Q 3/68* (2013.01)

(58) Field of Classification Search
CPC ......... H04L 12/56; H04L 47/10; H04L 45/00; H04L 49/101; H04L 49/25; H04L 49/1576; H04L 49/203; H04L 49/602; H04L 49/1515; H04Q 3/68
See application file for complete search history.

(56) References Cited

U.S. PATENT DOCUMENTS

| | | |
|---|---|---|
| 6,418,142 B1 | 7/2002 | Wolf |
| 7,130,920 B1 | 10/2006 | Sailor |
| 7,596,135 B1 | 9/2009 | Iovine et al. |
| 2002/0146003 A1 | 10/2002 | Kam et al. |
| 2006/0159078 A1 | 7/2006 | Konda |

(Continued)

OTHER PUBLICATIONS

Intellectual Property Office Search and Examination Report, dated Jul. 23, 2015, regarding Application No. GB1409997.2, 7 pages.

(Continued)

*Primary Examiner* — Ian N Moore
*Assistant Examiner* — Brian T Le
(74) *Attorney, Agent, or Firm* — Yee & Associates, P.C.

(57) ABSTRACT

A method using a computer in conjunction with a non-transitory computer readable storage medium is provided comprising a computer receiving a message for forwarding at an ingress switch of a multi-stage circuit switching network. The method also comprises computer executing a first routing algorithm in transmitting the message, the algorithm comprising the computer determining at least one availability matrix for each middle switch, wherein a given middle switch comprises a switch between ingress and egress switches of the network. The method also comprises the computer assigning resources to a selected middle switch and updating the availability matrix and causing the ingress switch to transmit the message via the middle switch based on determining a first availability matrix for the middle switch using the algorithm wherein the algorithm is executed to forward messages on at least one of unicast, fan-in, and fan-out bases and minimize blocking and imbalance on middle switches.

16 Claims, 14 Drawing Sheets

(56) References Cited

U.S. PATENT DOCUMENTS

| | | | | |
|---|---|---|---|---|
| 2006/0165111 | A1* | 7/2006 | Varma | H04L 49/357 370/428 |
| 2008/0212472 | A1* | 9/2008 | Musacchio | H04Q 3/68 370/232 |
| 2008/0285449 | A1* | 11/2008 | Larsson | H04L 49/1515 370/232 |
| 2011/0135301 | A1* | 6/2011 | Myslinski | H04B 10/572 398/34 |

OTHER PUBLICATIONS

Ayandeh, "A distributed semi-rearrangeable nonblocking path hunt algorithm for Clos networks with TDM links," IEEE International Conference on Communications (ICC 2002), vol. 5, Apr. 2002, pp. 2832-2842.

Kim et al., "Performance of split routing algorithm for three-stage multicast networks," IEEE/ACM Transactions on Networking, vol. 8, No. 4, Aug. 2000, pp. 526-534.

United Kingdom Intellectual Property Office Examination Report, dated Jan. 25, 2016, regarding Application No. GB1409997.2, 3 pages.

Scott, "Routing Information Through a Blocking Splitter-Combiner Network," USPTO Patent Application, filed Jan. 16, 2013, 33 pages.

Clos, "A Study of Non-Blocking Switching Networks," Bell System Technical Journal, vol. 32, No. 2, Mar. 1953, pp. 406-424.

"Introduction to Clos Networks," Stanford University, 1 page, accessed Jun. 7, 2013. http://www.stanford.edu/class/ee384y/Handouts/clos_networks.pdf.

"Clos network," Wikipedia Foundation, Inc., last modified Mar. 16, 2013, 5 pages, accessed Apr. 16, 2013. http://en.wikipedia.org/wiki/Clos_network.

United Kingdom Intellectual Property Office Examination Report, dated Jul. 14, 2016, regarding Application No. GB1409997.2, 2 pages.

* cited by examiner

SWITCH ROUTING ALGORITHMS

BACKGROUND INFORMATION

1. Field

The present disclosure relates generally to transmission of messages across multiple switch networks and, in particular, to systems and methods of applying routing algorithms to routing messages through Clos networks to improve economy and speed in message processing.

2. Background

Network managers seek ways to move message traffic from senders to recipients more quickly and more cheaply. Such managers endeavor to use existing installed switching hardware and software more efficiently. More efficient use may lead to productivity improvements while avoiding the need for further investment. By spreading network load more efficiently over currently available switching resources, the goals of greater productivity without incremental capital investment may be achieved.

Networks may become congested or otherwise burdened with excessive message volume or other processing problems due to improper or lack of load balancing between switches and other hardware. Some hardware may be excessively loaded while neighboring hardware may sit underutilized. Information technology managers may unnecessarily make investment in new hardware and software when existing networks are not optimally configured.

SUMMARY

The illustrative embodiments provide a method using a computer in conjunction with a non-transitory computer readable storage medium. The method comprises a computer receiving a message for forwarding at an ingress switch of a multi-stage circuit switching network. The method also comprises the computer executing a first routing algorithm in transmitting the message, the first routing algorithm comprising the computer determining at least one availability matrix for each middle switch of the multi-stage circuit switching network, wherein a given middle switch comprises a switch between the ingress switch and an egress switch of the multi-stage circuit switching network. The method also comprises the computer assigning resources to a selected middle switch and the computer updating the at least one availability matrix. The method also comprises the computer causing the ingress switch to transmit the message via the selected middle switch based on the computer determining a first availability matrix for the selected middle switch using the first routing algorithm.

The illustrative embodiments also provide an apparatus for forwarding a message, comprising a computer, comprising a bus, a processor connected to the bus, and a memory connected to the bus, the memory storing program code comprising at least a first routing algorithm which, when executed by the processor, performs a computer-implemented method, the program code comprising program code for receiving a plurality of messages for fan-in forwarding, the plurality of messages received by at least one ingress switch of a multi-stage circuit switching network. The program code also comprises program code for obtaining at least one availability matrix for each middle switch of the multi-stage circuit switching network, wherein a given middle switch comprises a switch between ingress switches and egress switches of the multi-stage circuit switching network. The program code also comprises program code for determining fan-in input bounds for each middle switch. The program code also comprises program code for determining a quantity of fan-in subchannels at output points of ingress switches to be transmitted to input points of middle switches. The program code also comprises program code for choosing, for each fan-in subchannel at output points of ingress switches, a first middle switch that maximizes utilization of fan-in capacity. The program code also comprises program code for assigning a first fan-in subchannel with maximum available connectivity to the first middle switch. The program code also comprises program code for transmitting the plurality of messages via the first middle switch. The program code also comprises program code for updating the at least one availability matrix and derived traffic and load metrics.

The illustrative embodiments also comprise a method using a computer in conjunction with a non-transitory computer readable storage medium, the method comprising the computer receiving a message for fan-out forwarding at an ingress switch of a multi-stage circuit switching network. The method also comprises the computer obtaining existing routing of the multi-stage circuit switching network. The method also comprises the computer obtaining destination subchannels and group by at least one egress switch on the multi-stage circuit switching network. The method also comprises the computer rearranging search sequence of at least one middle switch on the multi-stage circuit switching network by preference metric. The method also comprises, for each destination egress switch, the computer evaluating an availability table. The method also comprises, for each egress switch, the computer choosing a "max-min" path from the availability table, the "max-min" path describing maximum current availability and minimum current usage of routing capacity of at least one middle switch. The method also comprises, for each egress switch, the computer updating output column of the availability table and updating input column of the availability table. The method also comprises the computer transmitting the message based on evaluation of the availability table and based on choice of "max-min" path.

The features, functions, and benefits may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account the issues described above. Thus, the illustrative embodiments provide systems and methods for routing a plurality of messages through multi-stage circuit switching networks. The messages may be unicast (one sender to one recipient), fan-in (multiple senders to one recipient), fan-out (one sender to multiple recipients), or combinations of unicast, fan-in, and fan-out. The illustrative embodiments provide an algorithmic framework that manages various types of traffic through multiple switch networks that may be Clos networks. The illustrative embodiments may provide routing solutions that reduce a load on switching resources by avoiding unnecessary routing. Routing solutions may reduce a possibility of having to rearrange existing routing. Such routing solutions may take advantage of established Internet Protocol (IP) algorithms for unicast routing.

The illustrative embodiments provide an algorithmic framework based on determining an availability matrix for intermediate or middle switches of a three-stage Clos network. Algorithms provided by the framework analyze various combinations of middle switches in the network. The algorithms may enable routing messages through a combination of middle switches with the highest availability at the time. The algorithms may also support balancing of load through the Clos network. The availability matrix defines available resources at an input and output of switches at every stage of a Clos network in support of determining the best path for messages.

For fan-in messaging involving multiple messages going to one recipient, the algorithms attempt to combine as much of a processing load as possible as early in switching stages as possible to minimize traffic on middle switches. Conversely, for fan-out messaging wherein a single message is directed to multiple recipients, consumption of resources of middle switches may be reduced by deferring subchannel replication to later stages of the multi-stage network. Transmission of messages through multiple switch networks and their supporting methods and systems are described in further detail in "Routing Information through a Blocking Splitter-Combiner Network," U.S. patent application Ser. No. 13/350,851 dated Jan. 16, 2012, now U.S. Pat. No. 9,363,009, which is incorporated by reference herein in its entirety.

Figure 1:
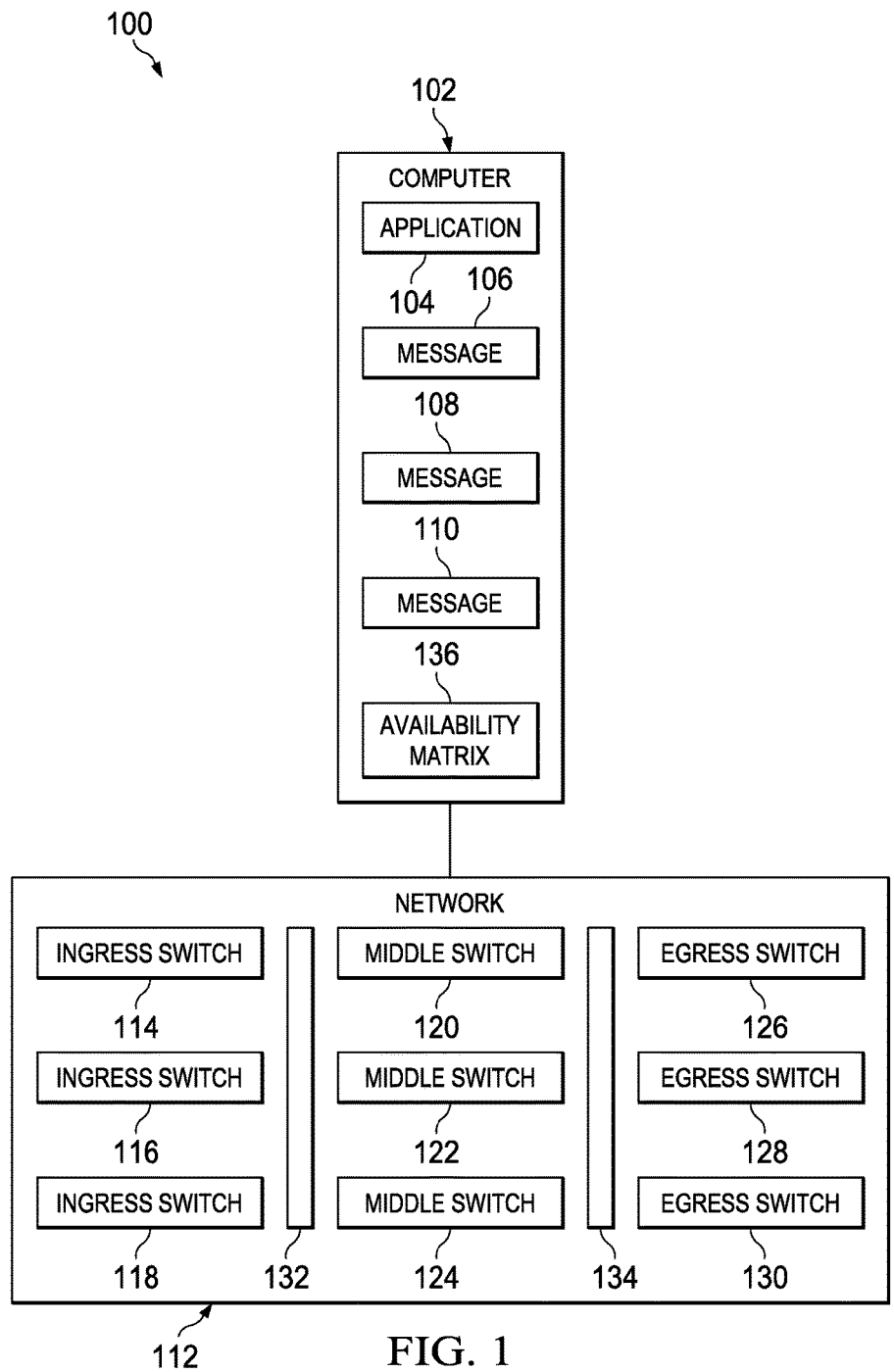
FIG. 1 is a block diagram of a system of a switch routing algorithm in accordance with an illustrative embodiment.

Attention is now turned to the figures. FIG. 1 is a block diagram of a system 100 of a switch routing algorithm in accordance with an illustrative embodiment. System 100 includes computer 102, application 104, message 106, message 108, message 110, network 112, ingress switch 114, ingress switch 116, ingress switch 118, middle switch 120, middle switch 122, middle switch 124, egress switch 126, egress switch 128, egress switch 130, interconnect 132, interconnect 134, and availability matrix 136.

Computer 102 may be a general purpose computer. General purpose computers are described with respect to FIG. 13. Application 104 executes on computer 102. Application 104 implements the steps of the methods provided herein including determining an efficient path to send message 106, message 108, and message 110 to at least one recipient via network 112. Application 104 includes at least one switch routing algorithm and supporting software for routing message 106, message 108, and message 110 as described herein.

Network 112 may be a multi-stage circuit switching network. In an embodiment, network 112 may be a time division multiple access (TDMA) multi-stage Clos network built from crossbar switches. A time division multiple access crossbar switch may be referred to as digital symmetric matrices (DSM). A Clos network may be appropriate when physical circuit switching needs exceed capacity of the largest feasible single crossbar switch. The complexity associated with implementing a cross bar, which may be a number of cross points, may be proportional to the square of the number of inputs/outputs, while with Clos network complexity may be linear. A required number of cross points (which make up each crossbar switch in the Clos network) may be fewer than were the entire switching system implemented with a single large crossbar switch.

A Clos network may have an ingress stage, a middle stage, and an egress stage. Ingress stage may alternatively be referred to as "input stage." Egress stage may alternatively be referred to as "output stage." Each stage is made up of a number of crossbar switches with the same number of inputs and outputs. A message or call entering an ingress crossbar switch may be routed through any of the available middle stage crossbar switches, to a relevant egress crossbar switch. A middle stage crossbar is available for a particular new call or message if both a link connecting the ingress switch to the middle stage switch and a link connecting the middle stage switch to the egress switch are available.

Network 112 includes at least one of ingress switch 114, ingress switch 116, ingress switch 118, middle switch 120, middle switch 122, middle switch 124, egress switch 126, egress switch 128, egress switch 130, interconnect 132, and interconnect 134. Network 112 may also includes other hardware and software components not specifically enumerated or described herein that support transmission of message 106, message 108, and message 110. Network 112 hosts crossbar switching between input and output of each ingress switch 114, ingress switch 116, ingress switch 118, middle switch 120, middle switch 122, middle switch 124, egress switch 126, egress switch 128, and egress switch 130.

Each of ingress switch 114, ingress switch 116, ingress switch 118, middle switch 120, middle switch 122, middle switch 124, egress switch 126, egress switch 128, and egress switch 130 are depicted in FIG. 1 as single entities. However, for illustration and explanation purposes each of ingress switch 114, ingress switch 116, ingress switch 118, middle switch 120, middle switch 122, middle switch 124, egress switch 126, egress switch 128, and egress switch 130 are provided in FIG. 3b through FIG. 11 with switch input functions and switch output functions separately depicted as described below.

The illustrative embodiments provide that a given switch, whether ingress, middle, or egress, may, at a given moment, have input or receiving capacity that differs from the output capacity of the switch. In the examples provided in FIG. 3b through FIG. 9, each of ingress switch 114, ingress switch 116, ingress switch 118, middle switch 120, middle switch 122, middle switch 124, egress switch 126, egress switch 128, and egress switch 130 has three channels available, viewed horizontally, and each channel has a total of four subchannels that may be used to one of receive or send messages. In an embodiment, ingress switch 114, ingress switch 116, ingress switch 118, middle switch 120, middle switch 122, middle switch 124, egress switch 126, egress switch 128, and egress switch 130 may have greater than or less than three input and output channels and each of the input and output channels may have greater than or less than four total subchannels.

Application 104, in implementing at least one switch routing algorithm provided herein, seeks a combination of input channels and output channels for a given switch that places a reduced burden on network 112 and may enable transmission of message 106, message 108, and message 110 that may more efficiently use switch resources and support higher traffic load. Movements of message volume within network 112 include transmission from output side or end of one switch to input side of another switch across interconnect 132 and interconnect 134. In an embodiment, message 106 exiting a given output subchannel of a first switch may be transmitted across interconnect 132 and interconnect 134 to a given input subchannel of a second switch as will be explained in connection with FIG. 3b.

Figure 2:
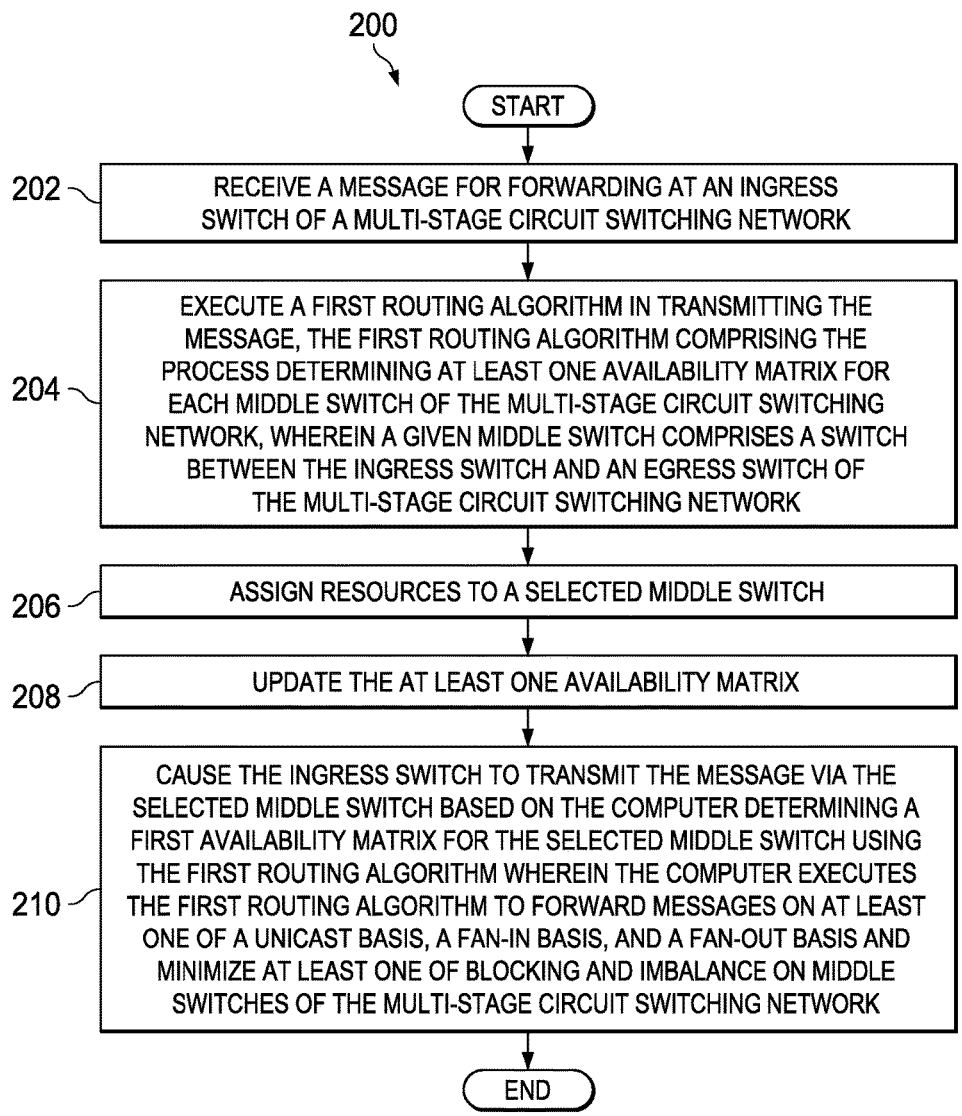
FIG. 2 is a flowchart of a method of a switch routing algorithm in accordance with an illustrative embodiment.

FIG. 2 is a flowchart of a method 200 of a switch routing algorithm in accordance with an illustrative embodiment. Method 200 shown in FIG. 2 may be implemented using system 100 of FIG. 1. The process shown in FIG. 2 may be implemented by a processor, such as processor unit 1304 of FIG. 13. The process shown in FIG. 2 may be a variation of the processes shown in FIG. 1 and FIG. 3b through FIG. 11. Although the operations presented in FIG. 2 are described as being performed by a "process," the operations are being performed by at least one tangible processor or using one or more physical devices, as described elsewhere herein. The term "process" also may include computer instructions stored on a non-transitory computer readable storage medium.

Method 200 may begin as the process receives a message for forwarding at an ingress switch of a multi-stage circuit switching network (operation 202). Thus, for example, computer 102 receives one of message 106, message 108, message 110 for forwarding at ingress switch 114, ingress switch 116, ingress switch 118 of multi-stage circuit switching network 112 of FIG. 1.

Next, the process may execute a first routing algorithm in transmitting the message, the first routing algorithm comprising the process determining at least one availability matrix for each middle switch of the multi-stage circuit switching network, wherein a given middle switch comprises a switch between the ingress switch and an egress switch of the multi-stage circuit switching network (operation 204). For example, computer 102 of FIG. 1 executes a first routing algorithm in transmitting the message, the first routing algorithm comprising computer 102 determining at least one availability matrix 136 for each middle switch 120, middle switch 122, middle switch 124 of the multi-stage circuit switching network 112, wherein a given middle switch 120, middle switch 122, middle switch 124 comprises a switch between the ingress switch 114, ingress switch 116, ingress switch 118 and an egress switch 126, egress switch 128, egress switch 130 of the multi-stage circuit switching network 112.

Next, the process assigns resources to a selected middle switch (operation 206). For example, computer 102 assigns resources to a selected middle switch 120, middle switch 122, and middle switch 124 of FIG. 1. Thus, assigned resources may be subchannels.

Next, the process updates the at least one availability matrix (operation 208). For example, computer 102 updates the at least one availability matrix 136 of FIG. 1. Next, the process causes the ingress switch to transmit the message via the selected middle switch based on the computer determining a first availability matrix for the selected middle switch using the first routing algorithm wherein the computer executes the first routing algorithm to forward messages on at least one of a unicast basis, a fan-in basis, and a fan-out basis and minimize at least one of blocking and imbalance on middle switches of the multi-stage circuit switching network (operation 210). For example, computer 102 of FIG. 1 causes the ingress switch 114, ingress switch 116, ingress switch 118 to transmit the message via the selected middle switch 120, middle switch 122, middle switch 124 based on computer 102 determining a first availability matrix 136 for the selected middle switch 120, middle switch 122, middle switch 124 using a first routing algorithm provided by application 104. Method 200 may terminate thereafter.

First routing algorithm described in method 200 may consider existing multi-stage switch network resource allocations to maximize utilization of forwarding capability at each stage of multi-stage circuit switching network. Multi-stage circuit switching network described in method 200 may correspond to network 112 provided by system 100. First availability matrix described in method 200 describes current availability and current usage of routing capacity of middle switches including, in embodiments, at least one of maximum current availability and maximum current usage. Middle switches described in method 200 may correspond to middle switch 120, middle switch 122, and middle switch 124 provided by system 100.

Computer described in method 200, which may correspond to computer 102 provided by system 100, may use first routing algorithm to execute fan-in forwarding at early stages of multi-stage circuit switching network and execute fan-out forwarding at latter stages of multi-stage circuit switching network.

Routing solutions provided by the first routing algorithm promote maintenance of existing routing arrangements. Computer described in method 200 may use first routing algorithm to determine a routing solution that reduces reallocation of resources by avoiding unnecessary routing.

Figure 3A:
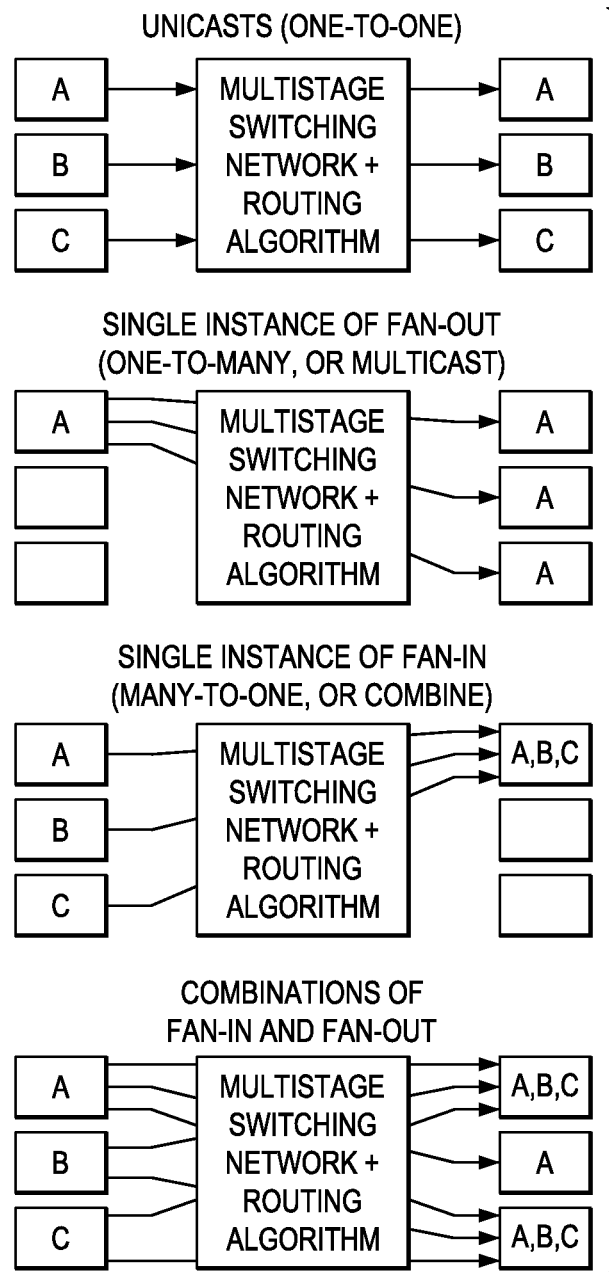
FIG. 3a is a block diagram of a system of a switch routing algorithm in accordance with an illustrative embodiment.

FIG. 3a is a block diagram of a system of a switch routing algorithm in accordance with an illustrative embodiment. FIG. 3a depicts four different embodiments of the present disclosure wherein switch routing algorithms provided by application 104 may be used to transmit message 106, message 108, message 110. Components shown in FIG. 3a are indexed to components shown in FIG. 1. Small rectangles in FIG. 3a represent sending stations and the letters therein indicate message 106, message 108, message 110 being sent. Some components of system 100 including computer 102, application 104, network 112, and availability matrix 136 are contained within the larger boxes entitled Multistage Switching Network+Routing Algorithm. Arrows in FIG. 3a may represent direction of transmission of message 106, message 108, and message 110. "One to one," also indicated as unicasts, is represented as three single stations or senders each unilaterally transmitting unique message 106, message 108, message 110 to single stations or recipients. "One to many," also indicated as multicast or fan-out, is represented as a single station or sender transmitting one message 106 to multiple stations or recipients. "Many to one," also indicated as "combine" or "fan-in", is represented as multiple stations or senders transmitting to a single station or recipient. "Many to many," also indicated as "fan-in and fan-out," is represented as multiple stations or senders transmitting to multiple stations or recipients where recipients may receive one or more of the sent message 106, message 108, message 110.

Figure 3B:
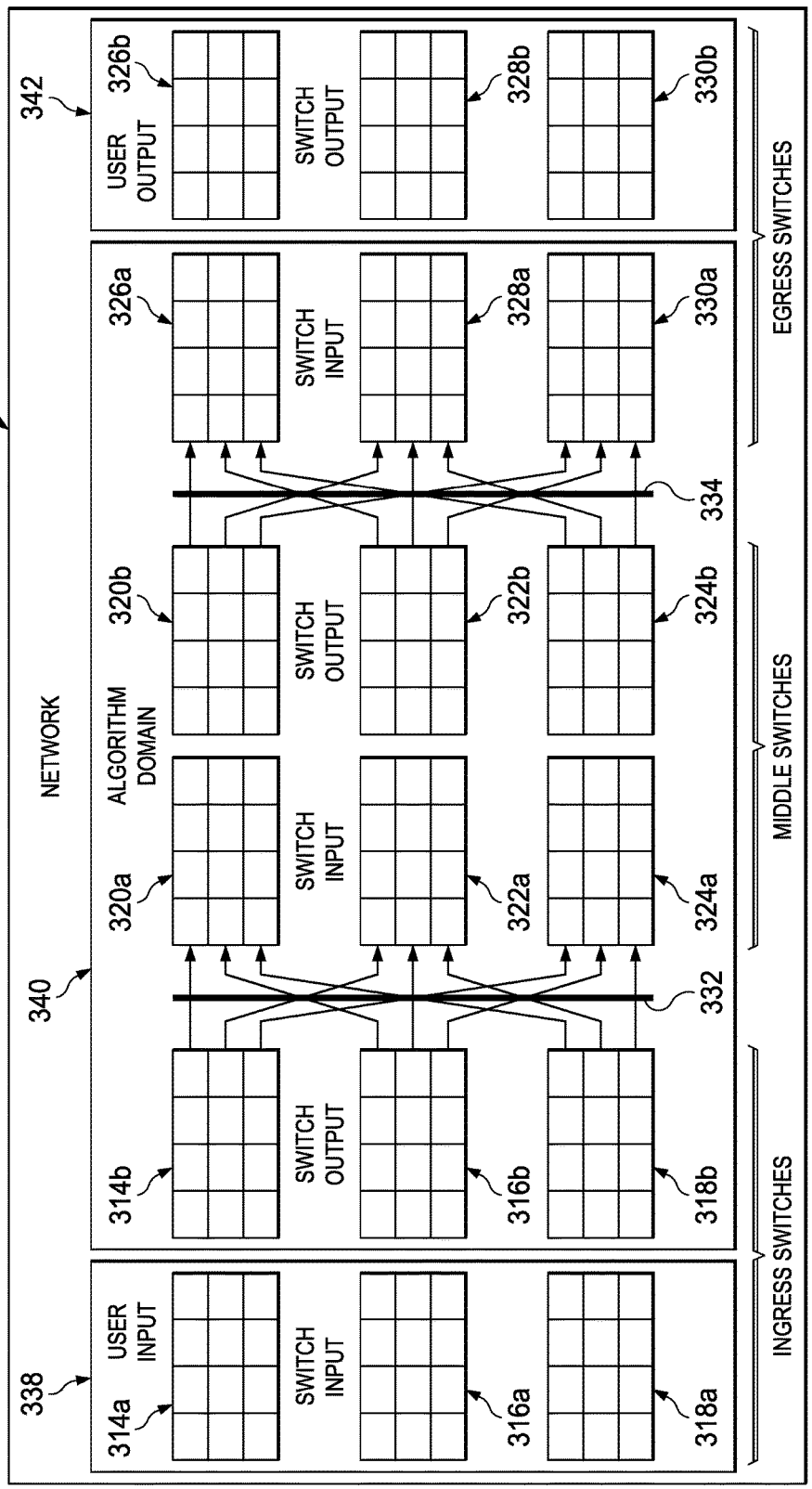
FIG. 3b is a block diagram of a system of a switch routing algorithm in accordance with an illustrative embodiment.

FIG. 3b is a block diagram of a system 300 of a switch routing algorithm in accordance with an illustrative embodiment. Components shown in FIG. 3b are indexed to components shown in FIG. 1. Network 312, ingress switch 314, ingress switch 316, ingress switch 318, middle switch 320, middle switch 322, middle switch 324, egress switch 326, egress switch 328, egress switch 330, interconnect 332, and interconnect 334 shown in FIG. 3b may correspond to network 112, ingress switch 114, ingress switch 116, ingress switch 118, middle switch 120, middle switch 122, middle switch 124, egress switch 126, egress switch 128, egress switch 130, interconnect 132, and interconnect 134 shown in FIG. 1.

For illustration purposes, FIG. 3b segments ingress switch 314, ingress switch 316, ingress switch 318, middle switch 320, middle switch 322, middle switch 324, egress switch 326, egress switch 328, and egress switch 330 into input and output functions and separately depicts these functions. While each of ingress switch 314, ingress switch 316, ingress switch 318, middle switch 320, middle switch 322, middle switch 324, egress switch 326, egress switch 328, and egress switch 330 may be a single physical unit, their input and output functionalities are depicted and labeled separately in FIG. 3b for illustration and discussion purposes. As a labeling convention and for discussion purposes henceforth, the letter "a" following a switch component number indicates input functionality for the switch. The letter "b" following a switch component number indicates output functionality for the switch. For example, middle switch 320 in FIG. 3b is labeled as 320a for input and 320b for output. Reference to middle switch input 320a is a reference to input functionality of middle switch 320. Reference to middle switch output 320b is a reference to output functionality of middle switch 320.

Further for illustration purposes, components depicted in FIG. 3b are segmented as one of user input 338, algorithm domain 340, and user output 342. Ingress switch input 314a, ingress switch input 316a, and ingress switch input 318a are designated as user input 338 because those components are the receiving points for at least one of message 106, message 108, and message 110 of FIG. 1.

Ingress switch output 314b, ingress switch output 316b, and ingress switch output 318b (the output functionality of ingress switch 314, ingress switch 316, ingress switch 318, respectively), middle switch 320, middle switch 322, middle switch 324, and egress switch input 326a, egress switch input 328a, and egress switch input 330a (the input functionality of egress switch 326, egress switch 328, and egress switch 330, respectively) are designated as algorithm domain 340 because it is on these components upon which the algorithms provided by application 104 operate. Egress switch output 326b, egress switch output 328b, and egress switch output 330b are designated in FIG. 3b as user output 342 because those components are transmission or exit points for message 106, message 108, and message 110 exiting system 300.

FIG. 3b also depicts a plurality of arrows that represent movement options of message 106, message 108, and message 110 across interconnect 332 between ingress switch 314, ingress switch 316, ingress switch 318 and middle switch 320, middle switch 322, middle switch 324. FIG. 3b also depicts a plurality of arrows that represent movement options of message 106, message 108, and message 110 across interconnect 334 from middle switch 320, middle switch 322, and middle switch 324 to egress switch 326, egress switch 328, and egress switch 330. Connections supporting transmissions between components may be short-lived and may not survive once a transmission is complete.

Switch routing algorithms provided by application 104 determine that transmissions originating from certain output channels of transmitting switches across interconnect 332 and interconnect 334 are directed to specific channels of receiving switches. Each of ingress switch 314, ingress switch 316, ingress switch 318 middle switch 320, middle switch 322, middle switch 324, egress switch 326, egress switch 328, and egress switch 330 has three channels for input and three channels for output. For example, ingress switch output 314b represents output functionality of ingress switch 314. Ingress switch output 314b provides three channels for output, wherein each of the three channels is represented as four subchannels that are depicted horizontally. In another example, middle switch input 324a represents input functionality of middle switch 324. Middle switch input 324a provides three channels for input or intake of message volume, wherein each of the three channels similarly is represented as four subchannels in a horizontal line. In yet another example, egress switch output 326b provides three channels for output of message volume. Channels are represented herein in the manner of four rectangular subchannels per channel in a horizontal line for discussion. In an embodiment, a channel may have more than or fewer than four subchannels.

In each of the three preceding examples chosen randomly from FIG. 3b, the three channels for each of ingress switch output 314b, middle switch input 324a, and egress switch output 326b are layered upon one another. Each of ingress switch 314, ingress switch 316, ingress switch 318, middle switch 320, middle switch 322, middle switch 324, egress switch 326, egress switch 328, and egress switch 330 is configured and represented in the same manner, with three input channels (collectively represented by "a") and three output channels (collectively represented by "b"), with the channels depicted horizontally and in layered fashion. For discussion purposes herein, the three channels of switches are referred to as top, middle, and bottom channels. In an embodiment, channels are not physically layered atop one another and subchannels within channels are not arranged in a horizontal or linear manner.

Arrows shown in FIG. 3b depict transmission of messaging from output or "b" functionality of transmitting switches to input or "a" functionality of receiving switches. As noted, the division herein of ingress switch 314, ingress switch 316, ingress switch 318, middle switch 320, middle switch 322, middle switch 324 egress switch 326, egress switch 328, and egress switch 330 into "a" and "b" portions is for illustration and discussion purposes only. In actuality, there is no such division of, for example, middle switch 322 into middle switch input 322a and middle switch output 322b.

The algorithms provided by application 104 determine that traffic from a given channel of a transmitting switch is sent to a specific channel of a receiving switch. This determination is based on present switch utilization as described in availability matrix 136 and other factors described herein. In the example depicted in FIG. 3b, traffic leaving the middle channel of ingress switch output 314b crosses interconnect 332 and goes to the top channel of middle switch input 322a. Traffic from the top channel of ingress switch output 316b is sent to the middle channel of middle switch input 320a. Traffic from the bottom channel of ingress switch output 318b is sent to the bottom channel of middle switch input 324a. The preceding are three examples of the nine total transmissions depicted from ingress switch output 314b, ingress switch output 316b, and ingress switch output 318b across interconnect 332 to middle switch input 320a, middle switch input 322a, and middle switch input 324a, respectively. Other variations are possible, and thus, this example does not necessarily limit the claimed inventions.

Traffic may move across interconnect 334 in a like manner as traffic crosses interconnect 332. Traffic sent from a given channel of a transmitting or "b" switch is sent to a specific channel of a receiving or "a" switch. In the example depicted in FIG. 3b, traffic leaving the bottom channel of middle switch output 322b goes to the middle channel of egress switch input 330a. Traffic from the middle channel of middle switch output 324b is directed to the bottom channel of egress switch input 328a. Traffic from the bottom channel of middle switch output 320b goes to the top channel of egress switch input 330a.

Figure 4:
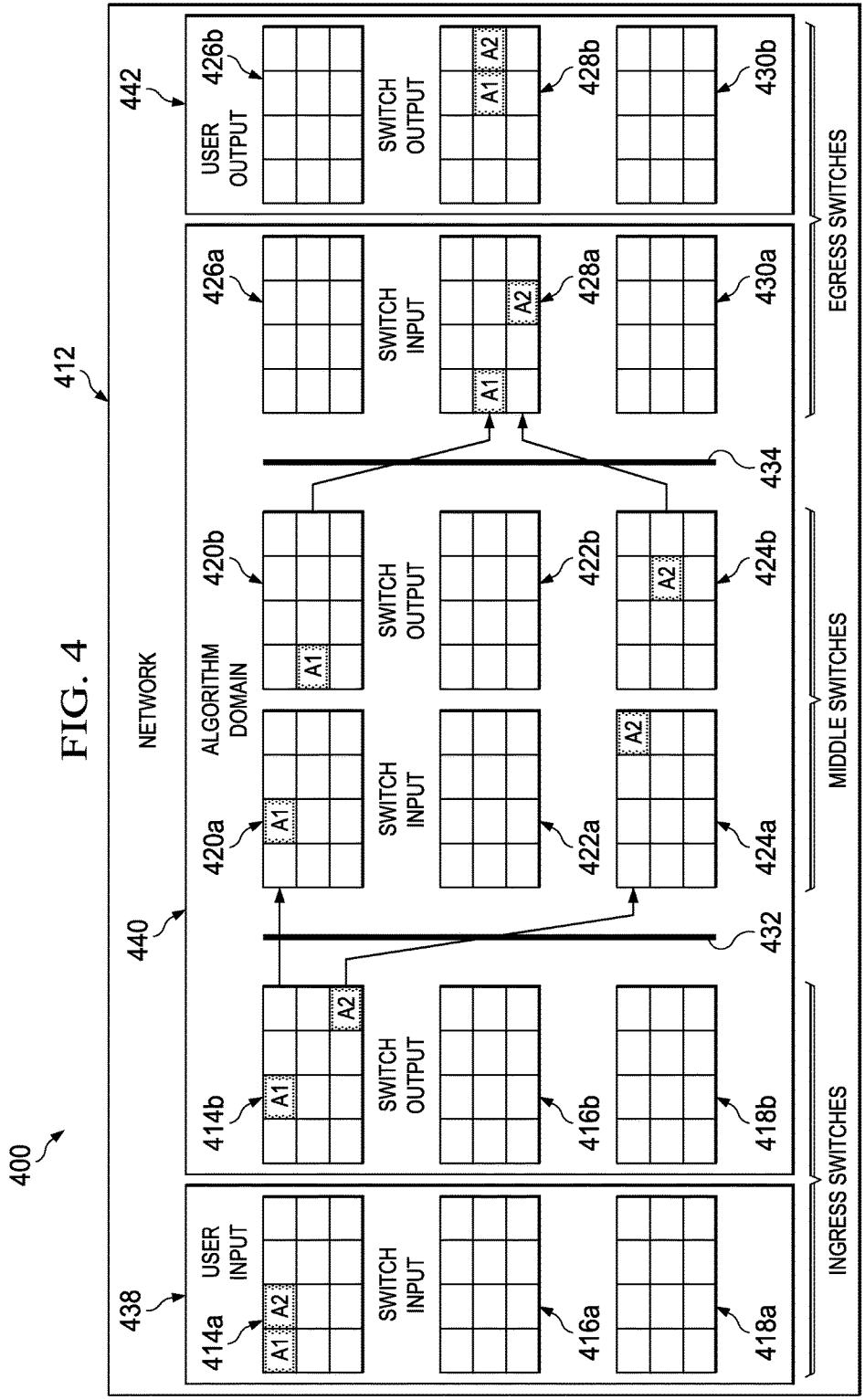
FIG. 4 is a block diagram of a system of a switch routing algorithm in accordance with an illustrative embodiment.

FIG. 4 is a block diagram of a system 400 of a switch routing algorithm in accordance with an illustrative embodiment. Components shown in FIG. 4 are indexed to components shown in FIG. 3b. Network 412, ingress switch 414, ingress switch 416, ingress switch 418, middle switch 420, middle switch 422, middle switch 424, egress switch 426, egress switch 428, egress switch 430, interconnect 432, and interconnect 434 shown in FIG. 4 correspond to network 312, ingress switch 314, ingress switch 316, ingress switch 318, middle switch 320, middle switch 322, middle switch 324, egress switch 326, egress switch 328, egress switch 330, interconnect 332, and interconnect 334 shown in FIG. 3b. User input 438, algorithm domain 440, and user output 442 shown in FIG. 4 correspond to user input 338, algorithm domain 340, and user output 342 shown in FIG. 3b. As with FIG. 3b, and for illustration purposes, ingress switch 414, ingress switch 416, ingress switch 418, middle switch 420, middle switch 422, middle switch 424, egress switch 426, egress switch 428, egress switch 430 are provided with input and output functionalities separately depicted. As with FIG. 3b, the letter "a" in a component label indicates an input functionality of a device and the letter "b" indicates output functionality.

FIG. 4 depicts two messages, designated as A1 and A2, entering network 412 at the top channel of ingress switch input 414a. A1 exits at the top channel of ingress switch output 414b. A1 exiting at the top channel of ingress switch output 414b may be a two dimensional mapping for A1 from input/channel 0 at subchannel index 0 to output/channel 0 at subchannel index 1. A2 exits at the bottom channel of ingress switch output 414b. Transmissions across interconnect 432 take place in a similar manner in FIG. 4 as discussed in connection with FIG. 3b and in accordance with determinations made by application 104 applying at least one switch routing algorithm. A1 is directed to the top channel of middle switch input 420a and message A2 is directed to the top channel of middle switch input 424a.

A1 and A2 exit middle switch 420 and middle switch 422, respectively, at different subchannels from which they entered for load or other reasons that may be associated with network 412 being a Clos network. For example, message A1 entered middle switch input 420a at the top channel and exits at the middle channel of middle switch output 420b. As noted, middle switch input 420a and middle switch output 420b represent input and output functions, respectively, of middle switch 420 and may occupy the same physical device.

FIG. 4 depicts A1 and A2 taking separate paths across network 412 from their origination point at ingress switch input 414a to their exit point at egress switch output 428b. Application 104 executes switch routing algorithms to determine paths across interconnect 432 and interconnect 434 that may best utilize capacity of receiving switches and deliver A1 and A2 such that load balancing may be promoted and higher traffic load may be supported.

Switch routing algorithms provided by application 104 of FIG. 1 may facilitate unicast message transmission across network 412. "Unicast transmission" is transmission of message 106, message 108, and message 110 from a single sender to a single recipient. Application 104 facilitating unicast transmission may be based on a worst-fit bin packing algorithm model. An objective of application 104 is to reduce or minimize imbalance of loads among middle switch 420, middle switch 422, and middle switch 424. Balancing load across middle switch 420, middle switch 422, and middle switch 424 may reduce a probability for needing to rearrange existing routing. Such reduction of probability for needing to rearrange existing routing may be attainable when a Clos network at least meets rearrangeable non-blocking (RANB) constraints.

Figure 5:
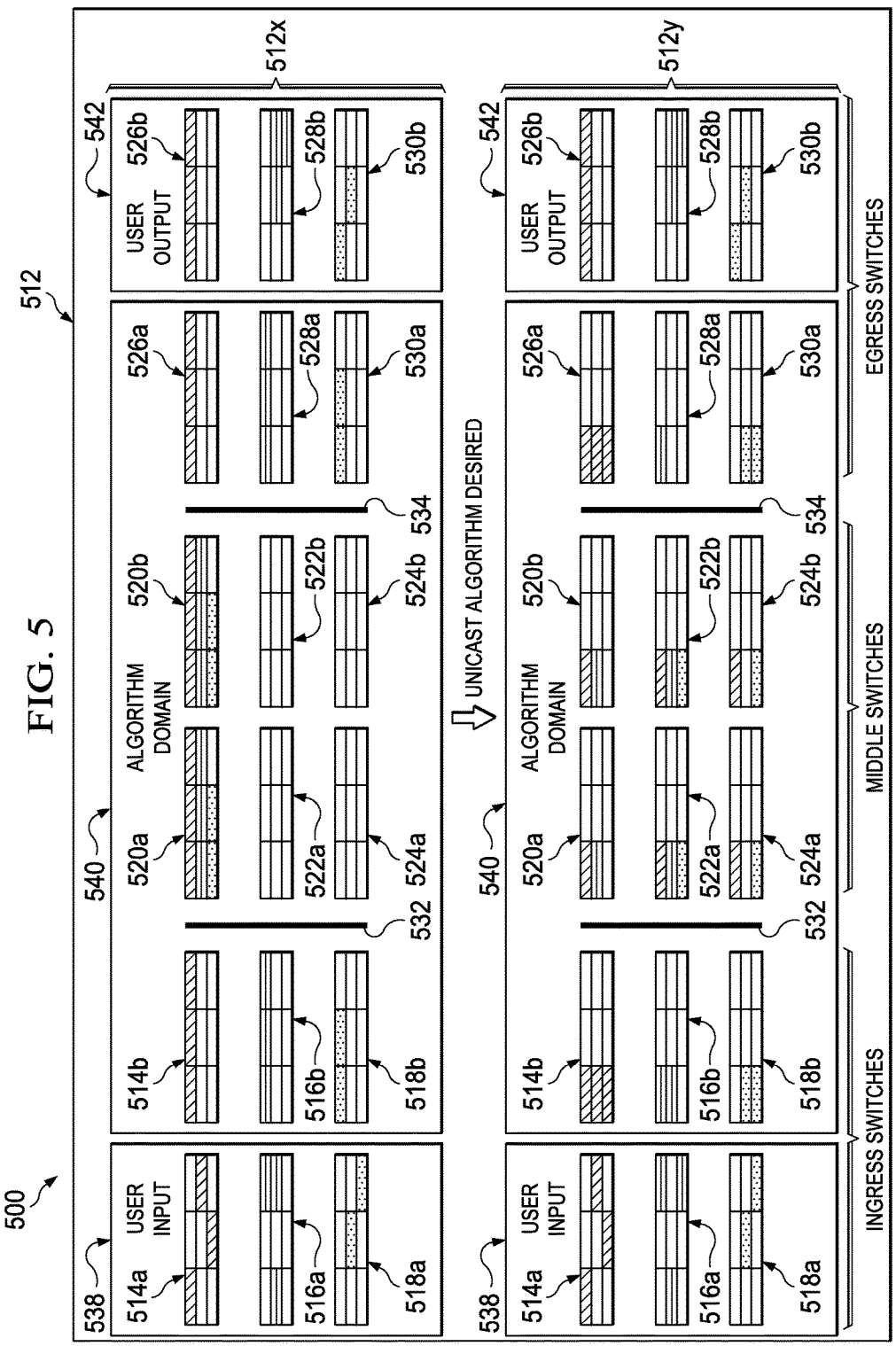
FIG. 5 is a block diagram of a system of a switch routing algorithm in accordance with an illustrative embodiment.

FIG. 5 is a block diagram of a system 500 of a switch routing algorithm in accordance with an illustrative embodiment. Components shown in FIG. 5 are indexed to components shown in FIG. 4. Network 512, ingress switch 514, ingress switch 516, ingress switch 518, middle switch 520, middle switch 522, middle switch 524, egress switch 526, egress switch 528, egress switch 530, interconnect 532, and interconnect 534 shown in FIG. 5 correspond to network 412, ingress switch 414, ingress switch 416, ingress switch 418, middle switch 420, middle switch 422, middle switch 424, egress switch 426, egress switch 428, egress switch 430, interconnect 432, and interconnect 434 shown in FIG. 4. User input 538, algorithm domain 540, and user output 542 shown in FIG. 5 correspond to user input 338, algorithm domain 340, and user output 342 shown in FIG. 3b. As with FIG. 4, and for illustration purposes, ingress switch 514, ingress switch 516, ingress switch 518, middle switch 520, middle switch 522, middle switch 524, egress switch 526, egress switch 528, egress switch 530 are provided with input and output functionalities separately depicted. As with FIG. 4, the letter "a" in a component label indicates an input functionality of a device and the letter "b" indicates output functionality.

FIG. 5 depicts two views of network 512. For discussion purposes, the two views of network 512 are depicted as network 512x and network 512y. The two views are provided to demonstrate unbalanced loading and balanced loading, respectively, of a Clos network that may be network 512. Network 512x may be viewed as a depiction of network 512 prior to application 104 applying at least one switch routing algorithm and reconfiguring message flow. Network 512y may be viewed as a depiction of network 512 after application of at least one switch routing algorithm and after reconfiguration of message flow.

For network 512x, congestion in middle switch 520 may be observed, with nearly all subchannels of middle switch 520 darkened, indicating use. At the same time, no subchannels of either middle switch 522 or middle switch 524 are darkened, indicating that those subchannels are not in use. Load in network 512x is clearly not balanced with middle switch 520 heavily overloaded and middle switch 522 and middle switch 524 minimally used.

For network 512y, congestion in middle switch 520, middle switch 522, middle switch 524 is now shown with each of middle switch 520, middle switch 522, middle switch 524 exhibiting approximately the same amount of usage. FIG. 5 also contains a label noting "Unicast Algorithm Desired" and an arrow pointing from network 512x to network 512y, indicating that at least one switch routing algorithm described herein may be desirable in providing load balancing not depicted in network 512x and depicted in network 512y.

Figure 6:
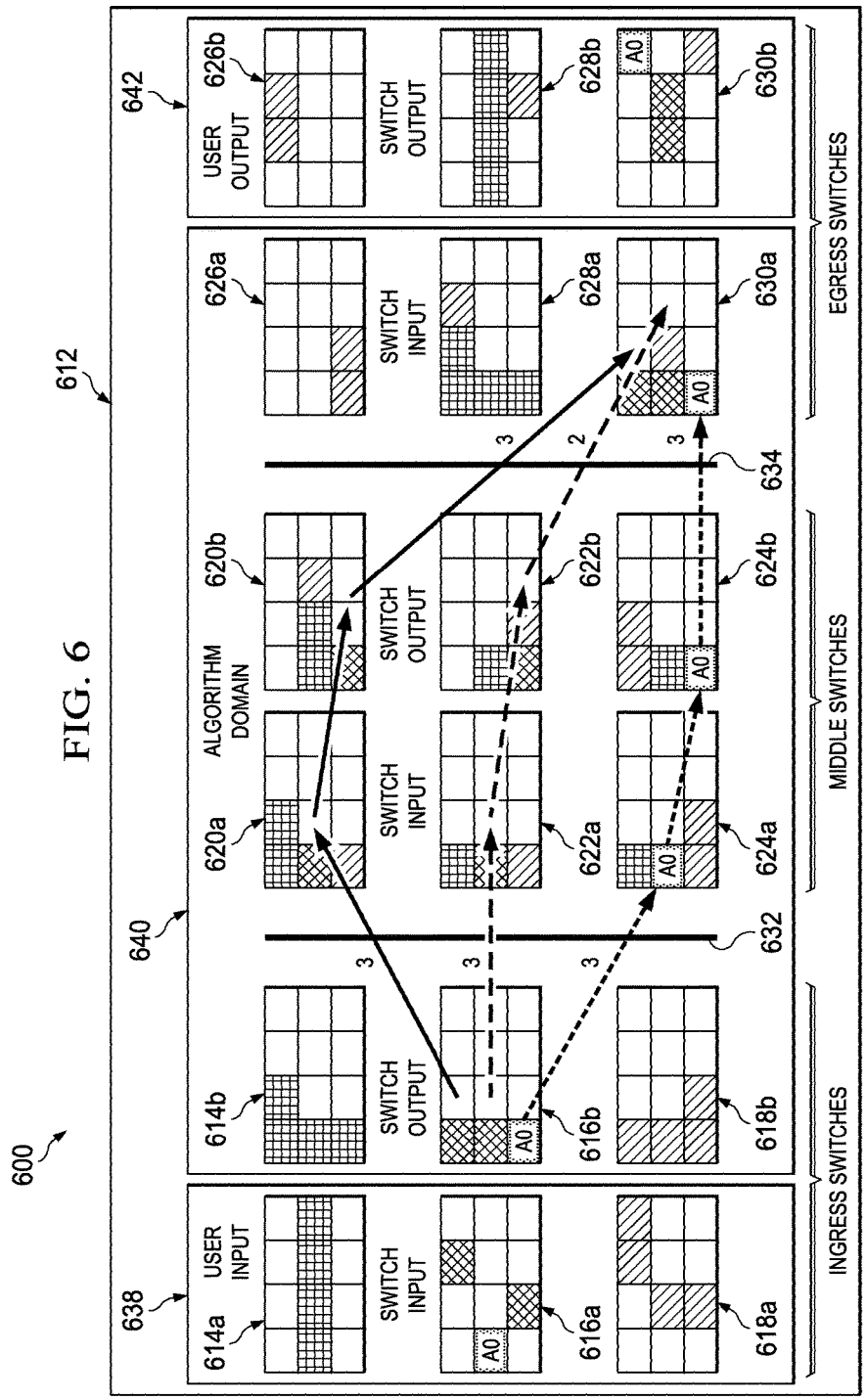
FIG. 6 is a block diagram of a system of a switch routing algorithm in accordance with an illustrative embodiment.

FIG. 6 is a block diagram of a system 600 of a switch routing algorithm in accordance with an illustrative embodiment. Components shown in FIG. 6 are indexed to components shown in FIG. 4. Network 612, ingress switch 614, ingress switch 616, ingress switch 618, middle switch 620, middle switch 622, middle switch 624, egress switch 626, egress switch 628, egress switch 630, interconnect 632, and interconnect 634 shown in FIG. 6 correspond to network 412, ingress switch 414, ingress switch 416, ingress switch 418, middle switch 420, middle switch 422, middle switch 424, egress switch 426, egress switch 428, egress switch 430, interconnect 432, and interconnect 434 shown in FIG. 4. User input 638, algorithm domain 640, and user output 642 shown in FIG. 6 correspond to user input 338, algorithm domain 340, and user output 342 shown in FIG. 3b. As with FIG. 4, and for illustration purposes, ingress switch 614, ingress switch 616, ingress switch 618, middle switch 620, middle switch 622, middle switch 624, egress switch 626, egress switch 628, egress switch 630 are provided with input and output functionalities separately depicted. As with FIG. 4, the letter "a" in a component label indicates an input functionality of a device and the letter "b" indicates output functionality.

Application 104 computes at least one availability matrix 136 of FIG. 1 for each middle switch 620, middle switch 622, and middle switch 624. Availability matrix 136 of FIG. 1 defines available resources at input and output for a given middle switch 620, middle switch 622, and middle switch 624. Application 104 determines which of middle switch 620, middle switch 622, and middle switch 624 has the most favorable combination of available input capacity and output capacity and may therefore be the best choice to process message 106, message 108, and message 110 of FIG. 1.

Availability matrix 136 of FIG. 1 may, for example, show that middle switch 620 presently has three available subchannels each for input and output, and may show that middle switch 622 presently has three available subchannels for input and two available subchannels for output. Further, middle switch 624 may be shown to have four input subchannels presently available and have four output subchannels presently available. Based on this information, application 104 of FIG. 1 determines that middle switch 624 has the most availability and sends message 106 via middle switch 624. Application 104 also updates availability matrix 136, reducing available subchannels of middle switch 624 to three each of input and output. Reduction of available subchannels of middle switch 624 to three each of input and output is indicated by the crossing out of "4" and replacement with "3" near middle switch input 624a and middle switch output 624b in FIG. 6. Availability matrix 136 is updated accordingly with the capacity reduction for middle switch 624. During execution of switch routing algorithms and during analysis of availability matrix 136, when a tie between present capacity of at least two of middle switch 620, middle switch 622, and middle switch 624 is the case, application 104 may use any heuristic tie-breaking method.

Figure 7:
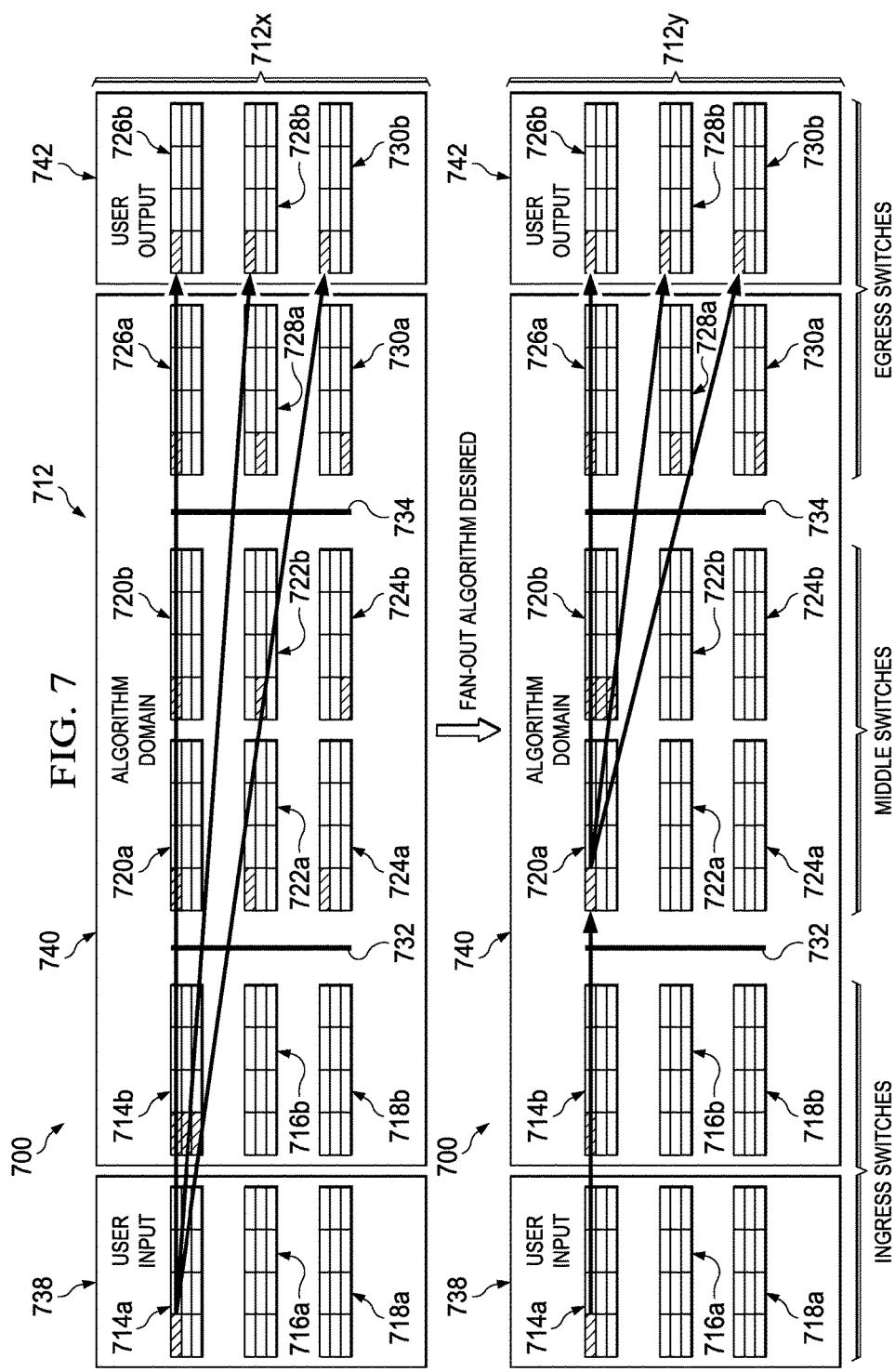
FIG. 7 is a block diagram of a system of a switch routing algorithm in accordance with an illustrative embodiment.

FIG. 7 is a block diagram of a system 700 of a switch routing algorithm in accordance with an illustrative embodiment. Components shown in FIG. 7 are indexed to components shown in FIG. 4. Network 712, ingress switch 714, ingress switch 716, ingress switch 718, middle switch 720, middle switch 722, middle switch 724, egress switch 726, egress switch 728, egress switch 730, interconnect 732, and interconnect 734 shown in FIG. 7 correspond to network 412, ingress switch 414, ingress switch 416, ingress switch 418, middle switch 420, middle switch 422, middle switch 424, egress switch 426, egress switch 428, egress switch 430, interconnect 432, and interconnect 434 shown in FIG. 4. User input 738, algorithm domain 740, and user output 742 shown in FIG. 7 correspond to user input 338, algorithm domain 340, and user output 342 shown in FIG. 3b. As with FIG. 4, and for illustration purposes, ingress switch 714, ingress switch 716, ingress switch 718, middle switch 720, middle switch 722, middle switch 724, egress switch 726, egress switch 728, egress switch 730 are provided with input and output functionalities separately depicted. As with FIG. 4, the letter "a" in a component label indicates an input functionality of a device and the letter "b" indicates output functionality.

Similar to FIG. 5, FIG. 7 depicts two views of network 712. For discussion purposes, the two views of network 712 are depicted as network 712x and network 712y. The two views are provided to demonstrate fan-out embodiments of the present disclosure wherein a single message 106 of FIG. 1 is directed to more than one recipient. A "fan-out" is effectively a set of multiple unicast messages. Switches at ingress, middle, and egress stages are capable of fan-out, but application 104 may seek to defer or delay fan-out as much as possible to later stages of network 712. Application 104 may also seek to minimize fan-out by switches at ingress stages. Application 104 may group destination subchannels by egress switch 726, egress switch 728, egress switch 730 that are common destinations for message 106. Application 104 of FIG. 1 may implement nesting of the step of updating availability matrix 136.

Network 712x is a depiction of fan-out messaging without the benefit of switch routing algorithms provided by application 104 of FIG. 1. As noted, application 104 seeks to reduce or minimize fan-out at ingress stages. In network 712x, fan-out or distribution of message 106 takes place at ingress switch 714a and does not use capacity of middle switch 720, middle switch 722, middle switch 724 to perform fan-out actions.

Network 712y, by contrast, is an example depiction of fan-out messaging with the benefit of switch routing algorithms provided by application 104. Fan-out takes place in network 712y at middle switch 720a and is thereafter distributed to egress switch 726, egress switch 728, egress switch 730. FIG. 7 also contains a label noting "Fan-out Algorithm Desired" and an arrow pointing from network 712x to network 712y, indicating that at least one switch routing algorithm described herein may promote more efficient use of switch resources. Algorithms provided by application 104 for fan-out may reduce or minimize allocation of resources within a switch. Such action may be opposite embodiments involving unicast transmissions.

Figure 8:
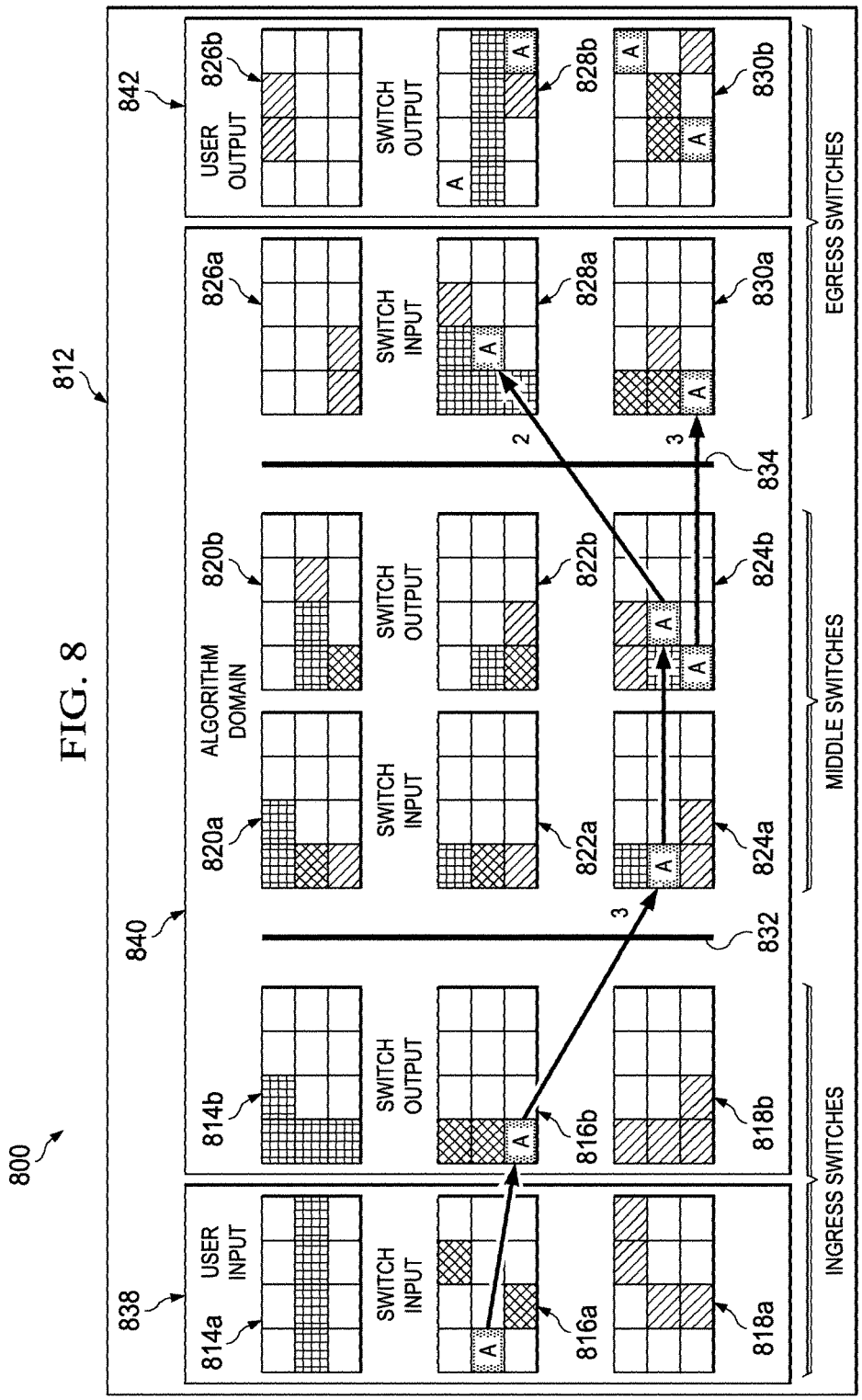
FIG. 8 is a block diagram of a system of a switch routing algorithm in accordance with an illustrative embodiment.

FIG. 8 is a block diagram of a system 800 of a switch routing algorithm in accordance with an illustrative embodiment. Components shown in FIG. 8 are indexed to components shown in FIG. 4. Network 812, ingress switch 814, ingress switch 816, ingress switch 818, middle switch 820, middle switch 822, middle switch 824, egress switch 826, egress switch 828, egress switch 830, interconnect 832, and interconnect 834 shown in FIG. 8 correspond to network 412, ingress switch 414, ingress switch 416, ingress switch 418, middle switch 420, middle switch 422, middle switch 424, egress switch 426, egress switch 428, egress switch 430, interconnect 432, and interconnect 434 shown in FIG. 4. User input 838, algorithm domain 840, and user output 842 shown in FIG. 8 correspond to user input 338, algorithm domain 340, and user output 342 shown in FIG. 3b. As with FIG. 4, and for illustration purposes, ingress switch 814, ingress switch 816, ingress switch 818, middle switch 820, middle switch 822, middle switch 824, egress switch 826, egress switch 828, egress switch 830 are provided with input and output functionalities separately depicted. As with FIG. 4, the letter "a" in a component label indicates an input functionality of a device and the letter "b" indicates output functionality.

FIG. 8 provides an example of fan-out in network 812. For each multicast source, shown as "A", application 104 gets existing routing that may be depicted in three shades of gray. Application 104 of FIG. 1 then gets destination subchannels and groups by destination egress switch 826, egress switch 828, and egress switch 830. Application 104 then rearranges search sequence of middle switch 820, middle switch 822, and middle switch 824 by preference metrics. For each destination egress switch 826, egress switch 828, and egress switch 830 in the rearranged order, application 104 evaluates availability matrix 136, chooses a "max-min" path from availability matrix 136, and updates output column of availability matrix 136. Application 104 thereafter updates input column of availability matrix 136. "Max-min" path describes maximum current availability and minimum current usage of capacity of at least one middle switch 820, middle switch 822, middle switch 824. Max-min path may correspond to a maximum availability between middle switch 820, middle switch 822, and middle switch 824. Availability of a given middle switch 820, middle switch 822, and middle switch 824 may be a minimum between available input and output resources that are idle, empty, or unused subchannels.

Figure 9:
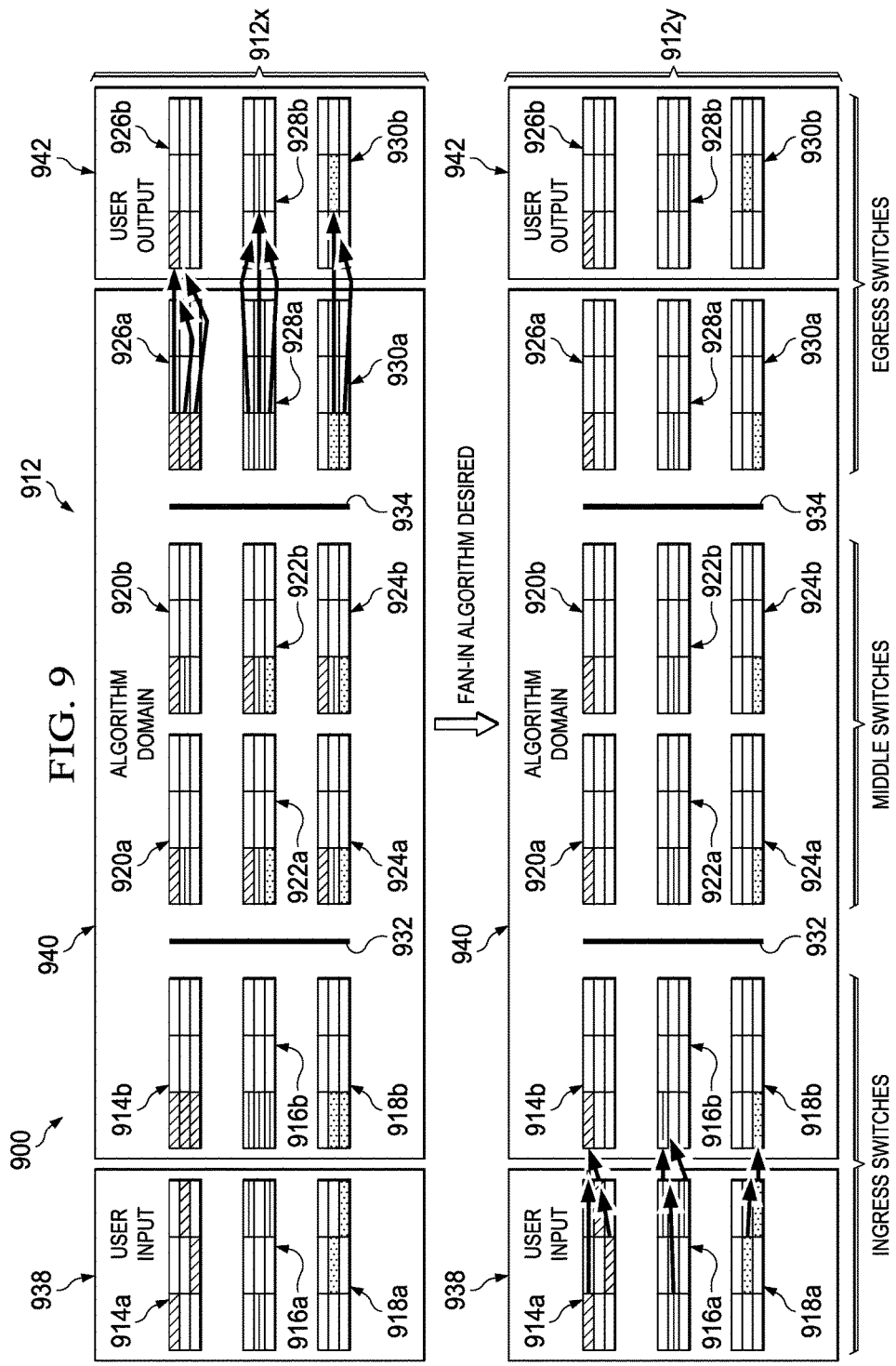
FIG. 9 is a block diagram of a system of a switch routing algorithm in accordance with an illustrative embodiment.

FIG. 9 is a block diagram of a system 900 of a switch routing algorithm in accordance with an illustrative embodiment. Components shown in FIG. 9 are indexed to components shown in FIG. 4. Network 912, ingress switch 914, ingress switch 916, ingress switch 918, middle switch 920, middle switch 922, middle switch 924, egress switch 926, egress switch 928, egress switch 930, interconnect 932, and interconnect 934 shown in FIG. 9 correspond to network 412, ingress switch 414, ingress switch 416, ingress switch 418, middle switch 420, middle switch 422, middle switch 424, egress switch 426, egress switch 428, egress switch 430, interconnect 432, and interconnect 434 shown in FIG. 4. User input 938, algorithm domain 940, and user output 942 shown in FIG. 9 correspond to user input 338, algorithm domain 340, and user output 342 shown in FIG. 3b. As with FIG. 4, and for illustration purposes, ingress switch 914, ingress switch 916, ingress switch 918, middle switch 920, middle switch 922, middle switch 924, egress switch 926, egress switch 928, egress switch 930 are provided with input and output functionalities separately depicted. As with FIG. 4, the letter "a" in a component label indicates an input functionality of a device and the letter "b" indicates output functionality.

FIG. 9 depicts fan-in capabilities of switch routing algorithms of application 104 of FIG. 1. Fan-in combines input subchannels to form an output subchannel. For subchannel combining, functional description may be labeled as F1(M, X,P) wherein there are M independent subchannels from any X ingress switches and there is one output subchannel. Further, at each stage of network 912, a maximum of P subchannels may be combined into a single subchannel. An assumption is that combining may take place at any stage of a Clos network.

At each stage of network 912, application 104 of FIG. 1 may attempt to combine as much as possible fan-in activity as early as possible during message transmission to reduce or minimize intermediate traffic or the usage of resources of middle switch 920, middle switch 922, and middle switch 924. A number of combined subchannels at switch output may be calculated as $SWi_{out}=\text{cell }(SWi_{in}/P)$, where $0 \leq i \leq r-1$ and where r is equal to a maximum quantity of switches in ingress stage or egress stage. Calculations may assume no existing traffic wherein relevant equations specify a maximum combination capability per switch stage.

Similar to FIG. 7, FIG. 9 depicts two views of network 912 for discussion purposes. The two views of network 912 are depicted as network 912x and network 912y. The two views are provided to demonstrate fan-in. Network 912x depicts network 912 configured without the benefit of application 104 of FIG. 1 and switch routing algorithms for fan-in not applied. Network 912y depicts network 912 configured with benefit of application 104. Many fewer subchannels are being used in network 912y, indicating more efficient resource usage made possible by the switch routing algorithms of the present disclosure.

System 100 may also provide program code for receiving a plurality of messages for fan-in forwarding. Such program code may be program code 1318 provided by data processing system 1300 described hereafter and illustrated in FIG. 13. The plurality of messages may be received by at least one ingress switch 114, ingress switch 116, and ingress switch 118 of multi-stage circuit switching network that may be network 112 provided by system 100. System 100 may also provide program code for determining fan-in input bounds for each middle switch 120, middle switch 122, and middle switch 124.

System 100 may also provide program code for determining quantity of fan-in subchannels at output points of ingress switch 114, ingress switch 116, and ingress switch 118 to be transmitted to input points of middle switch 120, middle switch 122, and middle switch 124. System 100 may also provide program code for choosing, for each fan-in subchannel at output points of ingress switch 114, ingress switch 116, and ingress switch 118, a first middle switch 120, middle switch 122, and middle switch 124 that maximizes utilization of fan-in capacity.

System 100 may also provide program code for updating at least one availability matrix 136 and derived traffic and load metrics. Program code for such updating may include at least one routing algorithm that forwards messages on at least one of a unicast basis, a fan-in basis, and a fan-out basis and minimizes at least one of blocking and imbalance on middle switch 120, middle switch 122, and middle switch 124 of multi-stage circuit switching network. System 100 may also provide program code that minimizes use of resources of middle switch 120, middle switch 122, and middle switch 124 and performs load-balancing between middle switch 120, middle switch 122, and middle switch 124.

Figure 10:
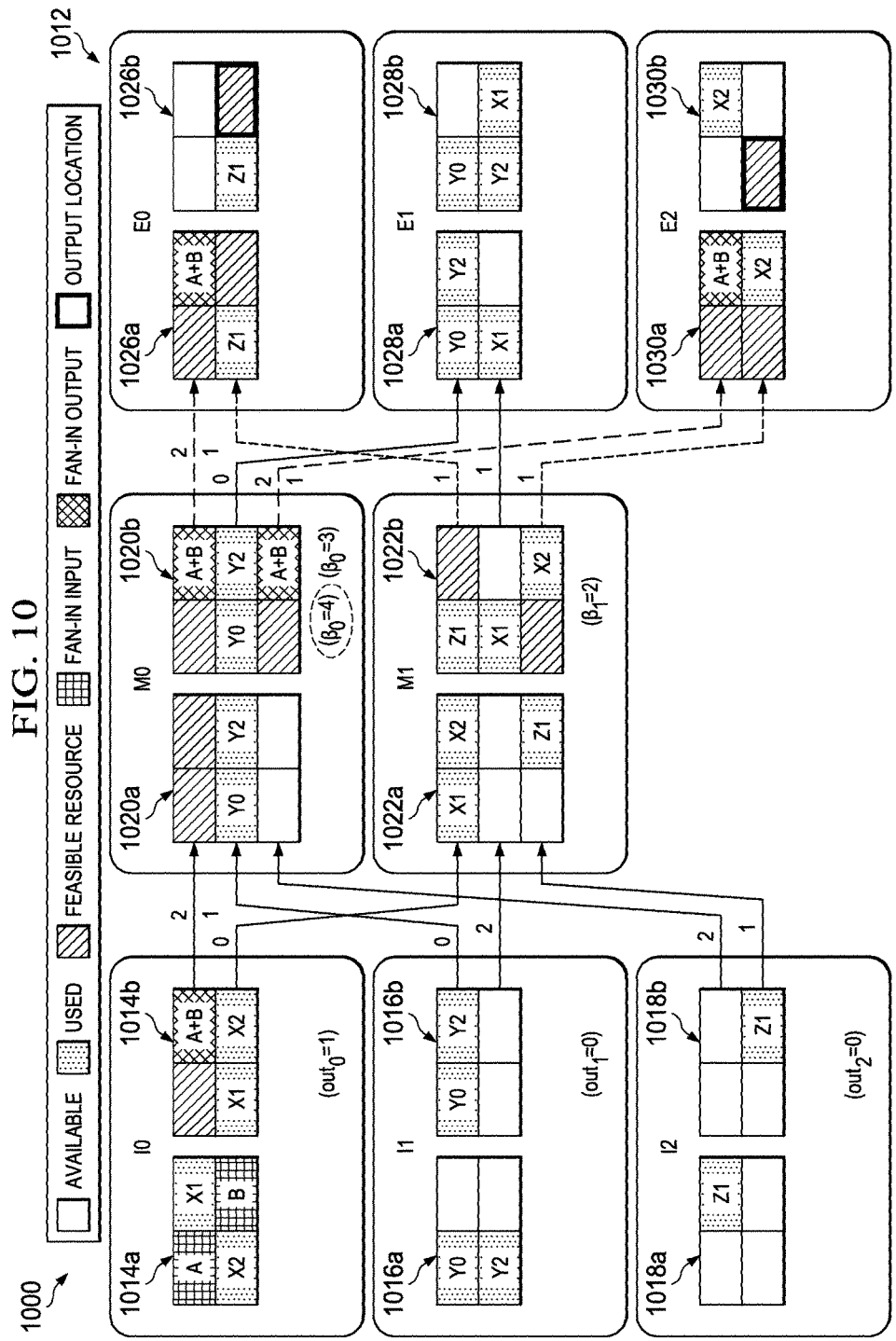
FIG. 10 is a block diagram of a system of a switch routing algorithm in accordance with an illustrative embodiment.

FIG. 10 is a block diagram of a system 1000 of a switch routing algorithm in accordance with an illustrative embodiment. Components shown in FIG. 10 are indexed to components shown in FIG. 4. Network 1012, ingress switch 1014, ingress switch 1016, ingress switch 1018, middle switch 1020, middle switch 1022, egress switch 1026, egress switch 1028, and egress switch 1030 shown in FIG. 10 correspond to network 412, ingress switch 414, ingress switch 416, ingress switch 418, middle switch 420, middle switch 422, egress switch 426, egress switch 428, and egress switch 430 shown in FIG. 4. As with FIG. 4, and for illustration purposes, ingress switch 1014, ingress switch 1016, ingress switch 1018, middle switch 1020, middle switch 1022, egress switch 1026, egress switch 1028, and egress switch 1030 are provided with input and output functionalities separately depicted. As with FIG. 4, the letter "a" in a component label indicates an input functionality of a device and the letter "b" indicates output functionality.

FIG. 10 depicts an example of fan-in and fan-out processing of message 106 and message 108 of FIG. 1. Subchannels occupied by X1, X2, Y0, Y2, and Z1 are occupied and in use. Subchannels in egress switch output 1026b and egress switch output 1030b with bold frames are output frames and are feasible regions. A and B are representations of message 106 and message 108. Application 104 obtains current resources from availability matrix 136. Application 104 computes fan-in input capacity (denoted by $\beta_k$ where 0≤k≤m−1 and m is the number of middle switches) on middle switch input 1020a and middle switch input 1022a. Therefore, middle switch 1020 and middle switch 1022 are designated with $\beta_0=4$ and $\beta_1=2$, respectively derived using availability matrix 136. In addition, subchannels in FIG. 10 determined to be feasible resources become depicted as shaded without label.

Application 104 of FIG. 1 executes fan-in at ingress switch 1014, ingress switch 1016, and ingress switch 1018. A+B appears in ingress switch 1014b. For each fan-in subchannel at ingress switch 1014b, ingress switch 1016b, and ingress switch 1018b, application 104 executes three steps.

In the first step, application 104 of FIG. 1 chooses one of middle switch input 1020a and middle switch input 1022a that maximizes utilization of fan-in capability. Application 104 chooses middle switch input 1020a because $\beta_0=4$ for middle switch input 1020a while $\beta_1=2$ for middle switch input 1022a. Thus middle switch input 1020a is the selected device because middle switch input 1020a has greater availability at the time.

In the second step, application 104 of FIG. 1 assigns fan-in subchannel with maximum available connectivity to the chosen middle switch 1020. Application 104 also performs load balancing of middle switch resources. Application 104 directs transmission of A and B through middle switch output 1020b, further to egress switch input 1026a and egress switch input 1030a, and finally to egress switch output 1026b and egress switch output 1030b for delivery to message recipient.

Figure 11:
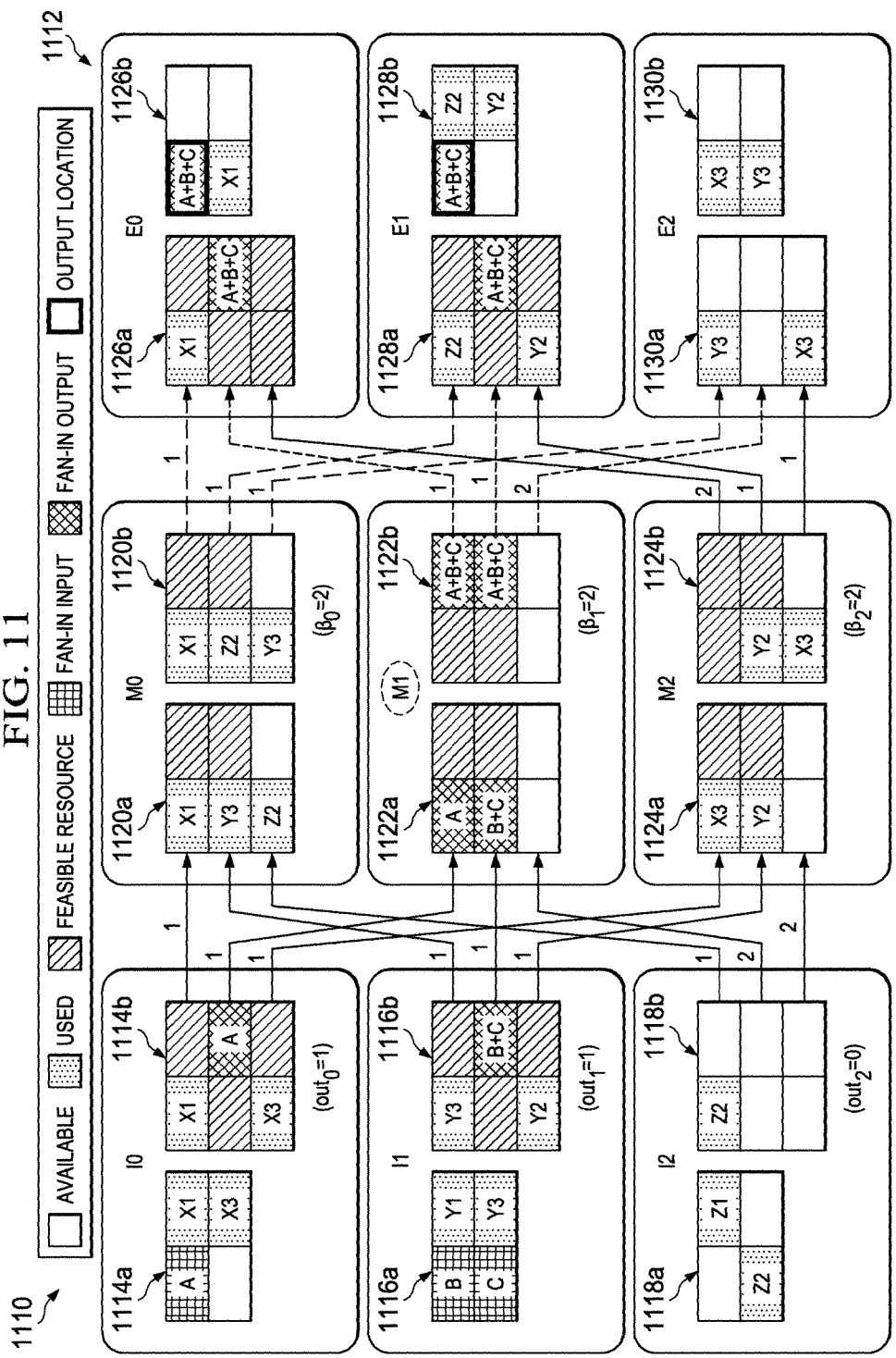
FIG. 11 is a block diagram of a system of a switch routing algorithm in accordance with an illustrative embodiment.

In the third step, application 104 of FIG. 1 updates availability matrix 136 and $\beta_0=3$ is updated and newly displayed for middle switch 1020, reflecting use of middle switch to transmit A and B in this example. FIG. 11 is a block diagram of a system 1100 of a switch routing algorithm in accordance with an illustrative embodiment. Components shown in FIG. 11 are indexed to components shown in FIG. 4. Network 1112, ingress switch 1114, ingress switch 1116, ingress switch 1118, middle switch 1120, middle switch 1122, middle switch 1124, egress switch 1126, egress switch 1128, and egress switch 1130 shown in FIG. 11 correspond to network 412, ingress switch 414, ingress switch 416, ingress switch 418, middle switch 420, middle switch 422, middle switch 424, egress switch 426, egress switch 428, and egress switch 430 shown in FIG. 4. As with FIG. 4, and for illustration purposes, ingress switch 1114, ingress switch 1116, ingress switch 1118, middle switch 1120, middle switch 1122, egress switch 1126, egress switch 1128, egress switch 1130 are provided with input and output functionalities separately depicted. As with FIG. 4, the letter "a" in a component label indicates an input functionality of a device and the letter "b" indicates output functionality.

FIG. 11 depicts another example of fan-in and fan-out processing of message 106, message 108, and message 110, represented as A, B, and C, respectively in FIG. 1. Subchannels marked X1, X3, Y1, Y2, Y3, Z1, and Z2 are presently in use. A enters network 1112 at ingress switch input 1114a. B and C enter network 1112 at ingress switch input 1116a. Egress switch output 1126b and egress switch output 1128b are depicted with bold frames and are indicated as feasible resources. Application 104 computes fan-in availability at middle switch 1120, middle switch 1122, and middle switch 1124. Fan-in availability for middle switch 1120 is $\beta_0=2$. Fan-in bound for middle switch 1122 is $\beta=4$. Fan-in availability for middle switch 1124 is $\beta_2=2$. Subchannels presently in use that are shaded without label in egress switch input 1126a, egress switch input 1128a, middle switch output 1120b, middle switch output 1122b, and middle switch output 1124b are designated as feasible resources.

Application 104 of FIG. 1 computes remaining fan-in subchannels at ingress output. Application 104 computes $out_0=1$ for ingress switch output 1114b, computes $out_1=1$ for ingress switch 1116b, and computes $out_2=0$ for ingress switch output 1118b. Subchannels that are shaded without label in ingress switch output 1114b, ingress switch output 1116b, middle switch input 1120a, middle switch input 1122a, and middle switch input 1124a are designated as feasible resources. Application 104 selects middle switch 1122 as having the highest fan-in availability. Application 104 also performs load balancing of middle switch resources at this step.

At a stage of fan-in ingress, A moves to ingress switch output 1114b. B and C move to ingress switch output 1116b. For each ingress output, application 104 assigns a load to at least one of middle switch 1120, middle switch 1122, and middle switch 1124 with maximum fan-in bound. A is sent to middle switch input 1122a. Availability matrix 136 is updated and the fan-in bound at middle switch output 1122b is updated, appearing as $\beta_1=3$. B and C are also sent to middle switch input 1122a. Availability matrix 136 is updated again and the fan-in bound at middle switch output 1122b is updated as being replaced with $\beta_1=2$.

Application 104 then completes fan-in of middle stage of network 1112 and fan-out to egress stage of network 1112. A, B, and C are sent to middle switch output 1122b. A, B, and C are then distributed at the egress stage, being sent partially to egress switch input 1126a and partially to egress switch input 1128a. A, B, and C then exit network 1112 in a similar manner, partially via egress switch output 1126b and partially via egress switch output 1128b.

Application 104 of FIG. 1 may replicate one subchannel to many subchannels. Fan-out may take place at any stage of network 112. Usage of resources may be minimized during fan-out by deferring subchannel replication to later stages of network 112. Application 104 executing fan-out may defer subchannel replication by using "delayed input updating", an asymmetric resource availability matrix updating algorithm.

For fan-in, multiple subchannels may be summed to form a single subchannel. Fan-in may take place at any stage of network 112. Application 104, executing fan-in, may minimize resources of middle switch 120, middle switch 122, and middle switch 124 while balancing loads of middle switch 120, middle switch 122, and middle switch 124 in network 112. Switch routing algorithms providing fan-in may take existing resource allocations into consideration to maximize utilization of capability for fan-in at each stage of network 112.

For multi-point to multi-point processing, fanned-in subchannels may be replicated to multiple subchannels. Fan-out is deferred to later stages of network 112. Fan-in takes place at earlier stages of network 112. Fan-in transmissions may be summed into one subchannel and later replicated out. Switch routing algorithms may determine at what stages of network 112 fan-in volume is summed and at what stages of network 112 the message volume is then replicated for fan-out and distribution to recipients. Switch routing algorithms make determinations based on load and other factors at what stages of network 112 fan-in and fan-out operations should take place. Fan-out transmissions may be executed at any stage of network 112.

Figure 12:
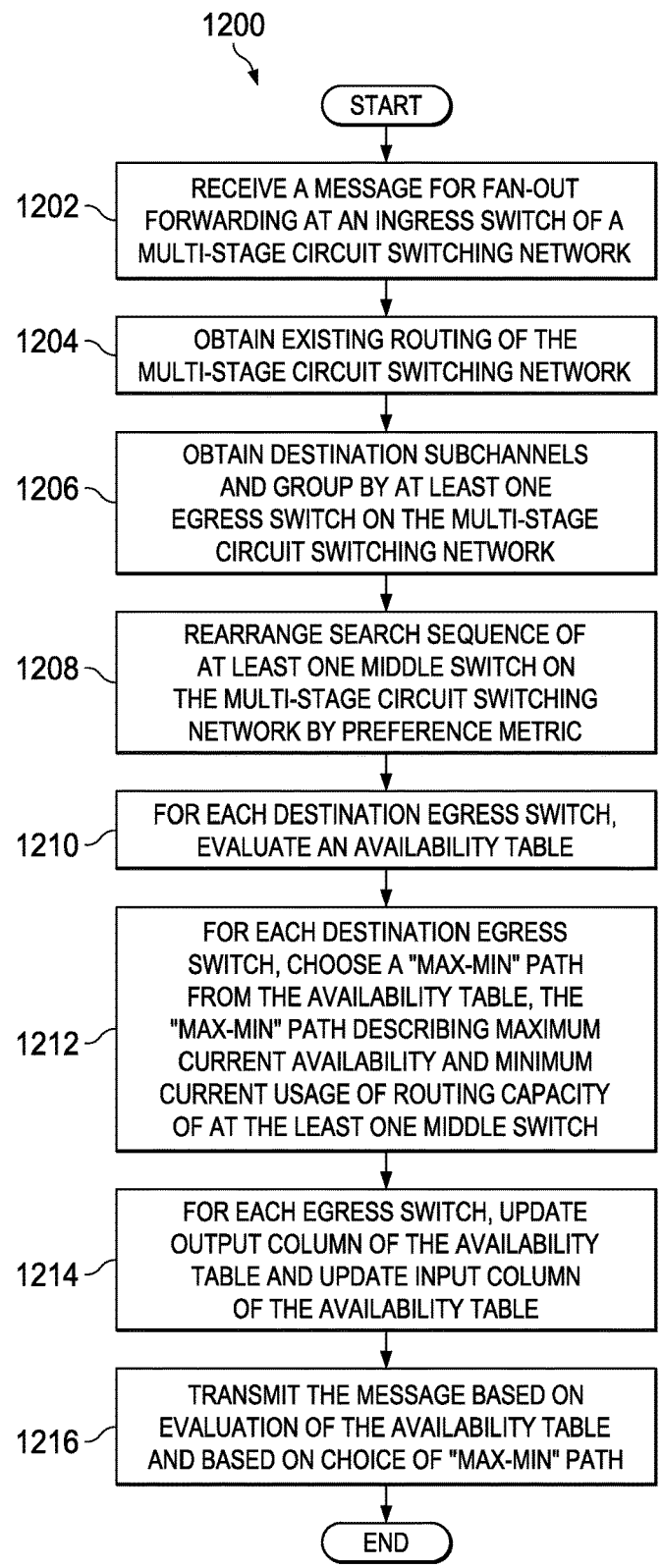
FIG. 12 is a flowchart of a method of a switch routing algorithm in accordance with an illustrative embodiment.

FIG. 12 is a flowchart of a method 1200 of a switch routing algorithm in accordance with an illustrative embodiment. Method 1200 shown in FIG. 12 may be implemented using system 100 of FIG. 1. The process shown in FIG. 12 may be implemented by a processor, such as processor unit 1304 of FIG. 13. The process shown in FIG. 12 may be a variation of the processes shown in FIG. 1 and FIG. 3b through FIG. 11. Although the operations presented in FIG. 12 are described as being performed by a "process," the operations are being performed by at least one tangible processor or using one or more physical devices, as described elsewhere herein. The term "process" also includes computer instructions stored on a non-transitory computer readable storage medium.

Method 1200 may begin as the process receives a message for fan-out forwarding at an ingress switch of a multi-stage circuit switching network (operation 1202). Next, the process obtains existing routing of the multi-stage circuit switching network (operation 1204).

Next, the process obtains destination subchannels and group by at least one egress switch on the multi-stage circuit switching network (operation 1206). Next, the process rearranges search sequence of at least one middle switch on the multi-stage circuit switching network by preference metric (operation 1208).

Next, for each destination egress switch, the process evaluates an availability table (operation 1210). Next, for each destination egress switch, the process chooses a "max-min" path from the availability table, the "max-min" path describing maximum current availability and minimum current usage of routing capacity of at the least one middle switch (operation 1212).

Next, for each destination egress switch, the process updates output column of the availability table and updates input column of the availability table (operation 1214). Next, the process transmits the message based on evaluation of the availability table and based on choice of "max-min" path wherein the computer executes at least one routing algorithm to forward messages on at least one of a unicast basis, a fan-in basis, and a fan-out basis and minimize at least one of blocking and imbalance on middle switches of the multi-stage circuit switching network (operation 1216). The method 1200 may terminate thereafter.

The operations shown in FIG. 12 may be varied. For example, not all steps are necessarily performed in the order given. Accordingly, the operations shown in FIG. 12 do not necessarily limit the claimed inventions.

Routing solutions provided by the at least one routing algorithm provided by method 1200 may promote maintenance of existing routing arrangements. Subchannel replication provided at least by method 1200 may be deferred by using delayed-input updating comprising asymmetric resource availability matrix updating algorithm.

Figure 13:
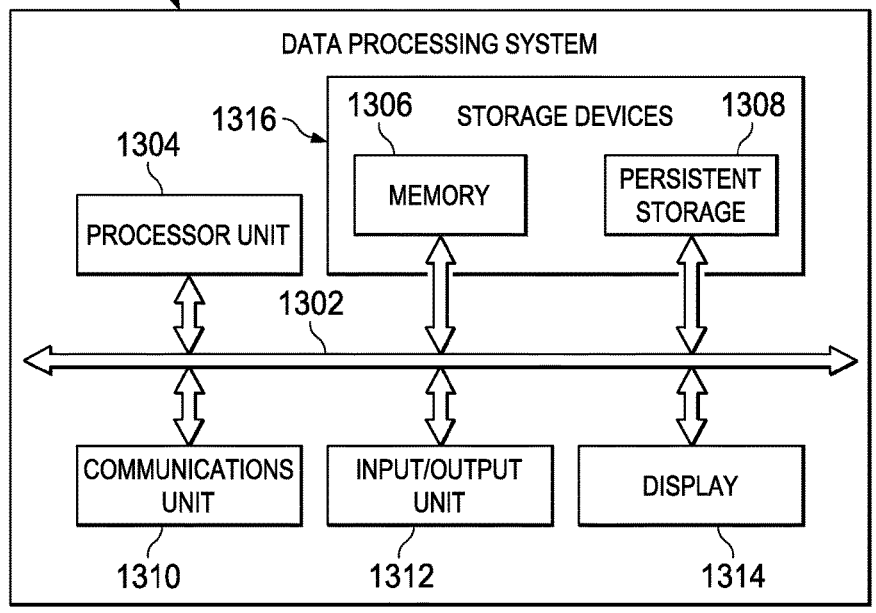
FIG. 13 is an illustration of a data processing system, in accordance with an illustrative embodiment.
Figure 13:
Figure 13:
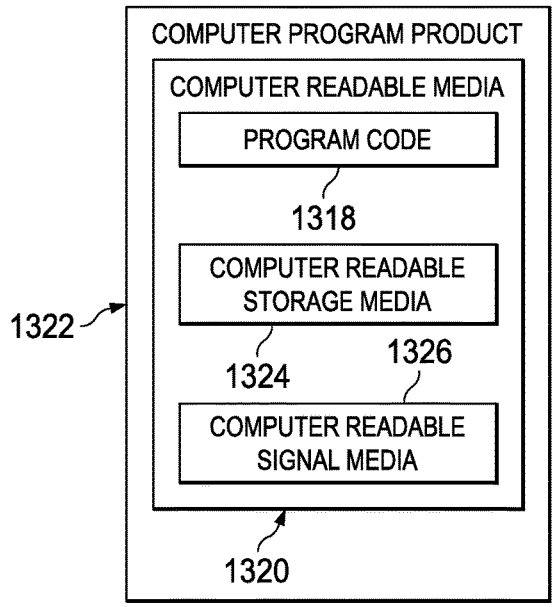

Turning now to FIG. 13, an illustration of a data processing system is depicted in accordance with an illustrative embodiment. Data processing system 1300 in FIG. 13 is an example of a data processing system that may be used to implement the illustrative embodiments, such as system 100 of FIG. 1, or any other module or system or process disclosed herein. In this illustrative example, data processing system 1300 includes communications fabric 1302, which provides communications between processor unit 1304, memory 1306, persistent storage 1308, communications unit 1310, input/output (I/O) unit 1312, and display 1314.

Processor unit 1304 serves to execute instructions for software that may be loaded into memory 1306. Processor unit 1304 may be a number of processors, a multi-processor core, or some other type of processor, depending on the particular implementation. A number, as used herein with reference to an item, means one or more items. Further, processor unit 1304 may be implemented using a number of heterogeneous processor systems in which a main processor is present with secondary processors on a single chip. As another illustrative example, processor unit 1304 may be a symmetric multi-processor system containing multiple processors of the same type.

Memory 1306 and persistent storage 1308 are examples of storage devices 1316. A storage device is any piece of hardware that is capable of storing information, such as, for example, without limitation, data, program code in functional form, and/or other suitable information either on a temporary basis and/or a permanent basis. Storage devices 1316 may also be referred to as computer readable storage devices in these examples. Memory 1306, in these examples, may be, for example, a random access memory or any other suitable volatile or non-volatile storage device. Persistent storage 1308 may take various forms, depending on the particular implementation.

For example, persistent storage 1308 may contain one or more components or devices. For example, persistent storage 1308 may be a hard drive, a flash memory, a rewritable optical disk, a rewritable magnetic tape, or some combination of the above. The media used by persistent storage 1308 also may be removable. For example, a removable hard drive may be used for persistent storage 1308.

Communications unit 1310, in these examples, provides for communications with other data processing systems or devices. In these examples, communications unit 1310 is a network interface card. Communications unit 1310 may provide communications through the use of either or both physical and wireless communications links.

Input/output (I/O) unit 1312 allows for input and output of data with other devices that may be connected to data processing system 1300. For example, input/output (I/O) unit 1312 may provide a connection for user input through a keyboard, a mouse, and/or some other suitable input device. Further, input/output (I/O) unit 1312 may send output to a printer. Display 1314 provides a mechanism to display information to a user.

Instructions for the operating system, applications, and/or programs may be located in storage devices 1316, which are in communication with processor unit 1304 through communications fabric 1302. In these illustrative examples, the instructions are in a functional form on persistent storage 1308. These instructions may be loaded into memory 1306 for execution by processor unit 1304. The processes of the different embodiments may be performed by processor unit 1304 using computer implemented instructions, which may be located in a memory, such as memory 1306.

These instructions are referred to as program code, computer usable program code, or computer readable program code that may be read and executed by a processor in processor unit 1304. The program code in the different embodiments may be embodied on different physical or computer readable storage media, such as memory 1306 or persistent storage 1308.

Program code 1318 is located in a functional form on computer readable media 1320 that is selectively removable and may be loaded onto or transferred to data processing system 1300 for execution by processor unit 1304. Program code 1318 and computer readable media 1320 form computer program product 1322 in these examples. In one example, computer readable media 1320 may be computer readable storage media 1324 or computer readable signal media 1326. Computer readable storage media 1324 may include, for example, an optical or magnetic disk that is inserted or placed into a drive or other device that is part of persistent storage 1308 for transfer onto a storage device, such as a hard drive, that is part of persistent storage 1308. Computer readable storage media 1324 also may take the form of a persistent storage, such as a hard drive, a thumb drive, or a flash memory, that is connected to data processing system 1300. In some instances, computer readable storage media 1324 may not be removable from data processing system 1300.

Alternatively, program code 1318 may be transferred to data processing system 1300 using computer readable signal media 1326. Computer readable signal media 1326 may be, for example, a propagated data signal containing program code 1318. For example, computer readable signal media 1326 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1318 may be downloaded over a network to persistent storage 1308 from another device or data processing system through computer readable signal media 1326 for use within data processing system 1300. For instance, program code stored in a computer readable storage medium in a server data processing system may be downloaded over a network from the server to data processing system 1300. The data processing system providing program code 1318 may be a server computer, a client computer, or some other device capable of storing and transmitting program code 1318.

The different components illustrated for data processing system 1300 are not meant to provide architectural limitations to the manner in which different embodiments may be implemented. The different illustrative embodiments may be implemented in a data processing system including components in addition to or in place of those illustrated for data processing system 1300. Other components shown in FIG. 13 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1304 may take the form of a hardware unit that has circuits that are manufactured or configured for a particular use. This type of hardware may perform operations without needing program code to be loaded into a memory from a storage device to be configured to perform the operations.

For example, when processor unit 1304 takes the form of a hardware unit, processor unit 1304 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 1318 may be omitted because the processes for the different embodiments are implemented in a hardware unit.

In still another illustrative example, processor unit 1304 may be implemented using a combination of processors found in computers and hardware units. Processor unit 1304 may have a number of hardware units and a number of processors that are configured to run program code 1318. With this depicted example, some of the processes may be implemented in the number of hardware units, while other processes may be implemented in the number of processors.

As another example, a storage device in data processing system 1300 is any hardware apparatus that may store data. Memory 1306, persistent storage 1308, and computer readable media 1320 are examples of storage devices in a tangible form.

In another example, a bus system may be used to implement communications fabric 1302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1306, or a cache, such as found in an interface and memory controller hub that may be present in communications fabric 1302.

Data processing system 1300 may also include associative memory. Associative memory may be in communication with communications fabric 1302. Associative memory may also be in communication with, or in some illustrative embodiments, be considered part of storage devices 1316. While one associative memory is shown, additional associative memories may be present.

The different illustrative embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters. The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method implemented in a computer for routing messages through a multi-stage circuit switching network, the method comprising:
   maintaining an availability matrix for each middle switch of the multi-stage circuit switching network comprising a plurality of middle switches between an ingress switch and an egress switch, wherein each availability matrix indicates therein available subchannels of a corresponding one of the plurality of middle switches for use to route messages;
   receiving a message for forwarding at the ingress switch of the multi-stage circuit switching network;
   determining, using the availability matrix for each middle switch, a selected middle switch of the plurality of middle switches of the multi-stage circuit switching network that has the most availability through which to route the message, wherein the availability of each middle switch in the plurality of middle switches is the minimum of available input subchannels and available output subchannels for each middle switch;
   executing a heuristic tie-breaking method between a first middle switch and a second middle switch in determining the selected middle switch;
   updating the availability matrix for the selected middle switch using an asymmetric resource availability matrix updating algorithm to indicate therein a reduction of the available subchannels of the selected middle switch; and
   causing the ingress switch to transmit the message via the selected middle switch on at least one of a unicast basis, a fan-in basis, and a fan-out basis.

2. The method of claim 1, wherein the multi-stage circuit switching network is a Clos network.

3. The method of claim 1, wherein each availability matrix describes current availability and current usage of routing capacity of a middle switch in the plurality middle switches.

4. The method of claim 1, further comprising executing fan-in forwarding at early stages of the multi-stage circuit switching network and executing fan-out forwarding at latter stages of the multi-stage circuit switching network.

5. The method of claim 1, further comprising determining routing solutions for unicast transmissions based on a worst-fit bin packing algorithm.

6. A method implemented in a computer for routing messages through a multi-stage circuit switching network, the method comprising:
   maintaining an availability matrix for each middle switch of the multi-stage circuit switching network comprising a plurality of middle switches between an ingress switch and an egress switch, wherein each availability matrix indicates therein available subchannels of a corresponding one of the plurality of middle switches for use to route messages in the multi-stage circuit switching network;
   receiving a message to forward to the egress switch of the multi-stage circuit switching network;
   determining, using the availability matrix for each middle switch, a selected middle switch of the plurality of middle switches in the multi-stage circuit switching network that has the most availability through which to route the message to the egress switch, wherein the availability of each middle switch in the plurality of middle switches is the minimum of available input subchannels and available output subchannels for each middle switch;

executing a heuristic tie-breaking method between a first middle switch and a second middle switch in determining the selected middle switch;

updating the availability matrix for the selected middle switch using an asymmetric resource availability matrix updating algorithm to indicate therein a reduction of the available subchannels of the selected middle switch; and transmitting the message to the egress switch using the selected middle switch.

7. The method of claim 6, wherein the message is a multicast message to be forwarded to one or more egress switches and wherein transmitting the multicast message includes dividing the multicast message into two or more unicast messages at the selected middle switch and forwarding the two or more unicast messages to the one or more egress switches.

8. The method of claim 6, wherein the message is one of two or more unicast messages on different input subchannels of the ingress switch and further comprising combining the two or more unicast messages into one output subchannel at the ingress switch.

9. The method of claim 6, wherein the availability matrix includes a table.

10. The method of claim 6, wherein the message is transmitted through a max-min path.

11. The method of claim 6, wherein the message is transmitted using a worst-fit bin packing algorithm.

12. An apparatus, comprising:
a multi-stage circuit switching network comprising a plurality of middle switches between an ingress switch and an egress switch; and
a computer configured to:
maintain an availability matrix for each middle switch of the multi-stage circuit switching network, wherein each availability matrix indicates therein available subchannels of a corresponding one of the plurality of middle switches for use to route messages in the multi-stage circuit switching network, receive a message to forward to the egress switch of the multi-stage circuit switching network, determine, using the availability matrix for each middle switch, a selected middle switch of the plurality of middle switches in the multi-stage circuit switching network that has the most availability through which to route the message to the egress switch, wherein the availability of each middle switch in the plurality of middle switches is the minimum of available input subchannels and available output subchannels for each middle switch, execute a heuristic tie-breaking method between a first middle switch and a second middle switch in determining the selected middle switch, update the availability matrix for the selected middle switch using an asymmetric resource availability matrix updating algorithm to indicate therein a reduction of the available subchannels of the selected middle switch, and transmit the message to the egress switch using the selected middle switch.

13. The apparatus of claim 12, wherein the computer is configured to cause the ingress switch to transmit the message via the selected middle switch on at least one of a unicast basis, a fan-in basis, and a fan-out basis.

14. The apparatus of claim 12, wherein the multi-stage circuit switching network is a Clos network.

15. The apparatus of claim 12, wherein the computer is configured to execute fan-in forwarding at early stages of the multi-stage circuit switching network and executing fan-out forwarding at latter stages of the multi-stage circuit switching network.

16. The apparatus of claim 12, wherein the computer is configured to determine routing solutions for unicast transmissions based on a worst-fit bin packing algorithm.

* * * * *